(12) United States Patent
Kijima et al.

(10) Patent No.: US 12,049,160 B2
(45) Date of Patent: Jul. 30, 2024

(54) VEHICLE SEAT

(71) Applicants: TACHI-S CO., LTD., Akishima (JP); Mitsubishi Jidousha Kogyo Kabushiki Kaisha, Tokyo (JP)

(72) Inventors: Yoshikazu Kijima, Akishima (JP); Akira Ogiso, Tokyo (JP); Yutaka Yasuda, Tokyo (JP)

(73) Assignees: TACHI-S CO., LTD., Akishima (JP); MITSUBISHI JIDOUSHA KOGYO KABUSHIKI KAISHA, Tokyo (JP)

( * ) Notice: Subject to any disclaimer, the term of this patent is extended or adjusted under 35 U.S.C. 154(b) by 400 days.

(21) Appl. No.: 17/599,724

(22) PCT Filed: Jan. 24, 2020

(86) PCT No.: PCT/JP2020/002546
§ 371 (c)(1),
(2) Date: Sep. 29, 2021

(87) PCT Pub. No.: WO2020/202733
PCT Pub. Date: Oct. 8, 2020

(65) Prior Publication Data
US 2022/0194272 A1 Jun. 23, 2022

(30) Foreign Application Priority Data
Mar. 29, 2019 (JP) .................. 2019-066252

(51) Int. Cl.
*B60N 2/04* (2006.01)
*B60N 2/30* (2006.01)
*B60N 2/68* (2006.01)

(52) U.S. Cl.
CPC ............. *B60N 2/3075* (2013.01); *B60N 2/68* (2013.01)

(58) Field of Classification Search
CPC ...... B60N 2/3075; B60N 2/68; B60N 2/3011; B60N 2/4248; B60N 2/42709
(Continued)

(56) References Cited

U.S. PATENT DOCUMENTS 5,385,389 A * 1/1995 Bishai ............... B60N 2/02
297/284.1
8,696,066 B2 * 4/2014 Mizobata ............. B60N 2/7011
297/440.22
(Continued)

FOREIGN PATENT DOCUMENTS

CN 108215954 A 6/2018
JP 2009-12545 A 1/2009
(Continued)

OTHER PUBLICATIONS

Office Action dated Dec. 29, 2022, issued in counterpart CN Application No. 202080022589.9. (8 pages).
(Continued)

*Primary Examiner* — Dennis H Pedder
(74) *Attorney, Agent, or Firm* — WHDA, LLP

(57) ABSTRACT

A vehicle seat that can suppress damage to an on-board object is provided. In each side frame of a cushion frame, an eccentric portion is eccentric outward in a right-left direction with respect to a base portion, and in each side frame of a back frame, an eccentric portion is eccentric inward in the right-left direction with respect to a base portion. Thus, when the load at the time of rear collision acts, each side frame of the cushion frame easily becomes deformed outward in the right-left direction, and each side frame of the back frame easily becomes deformed inward in the right-left direction. Accordingly, the deformation direction of each side frame of the cushion frame and the deformation direction of each side frame of the back frame can be easily made (Continued)

opposite to each other, and the deformations of the respective side frames and can be inhibited.

15 Claims, 8 Drawing Sheets

(58) Field of Classification Search
USPC ............ 296/65.01, 6, 5, 9, 16, 68.1; 297/15, 297/216.1
See application file for complete search history.

(56) References Cited

U.S. PATENT DOCUMENTS

| 10,604,042 B2 * | 3/2020 | Yasuda | .................... B60N 2/22 |
| 2011/0074189 A1 | 3/2011 | Sawada | |
| 2013/0033083 A1 * | 2/2013 | Sei | ......................... B60N 2/682 |
| | | | 297/452.18 |
| 2014/0103626 A1 | 4/2014 | Seki et al. | |
| 2018/0162247 A1 | 6/2018 | Yasuda et al. | |

FOREIGN PATENT DOCUMENTS

| JP | 4236983 B2 * | 3/2009 | ............... B60N 2/68 |
| JP | 2013-10451 A | 1/2013 | |
| JP | 2017-7666 A | 1/2017 | |
| JP | 2018-94974 A | 6/2018 | |
| WO | 2009/147892 A1 | 12/2009 | |

OTHER PUBLICATIONS

English translation of Office Action dated Dec. 29, 2022, issued in counterpart CN Application No. 202080022589.9. (6 pages).
International Search Report dated Mar. 10, 2020, issued in counterpart International Application No. PCT/JP2020/002546 (2 pages).

* cited by examiner

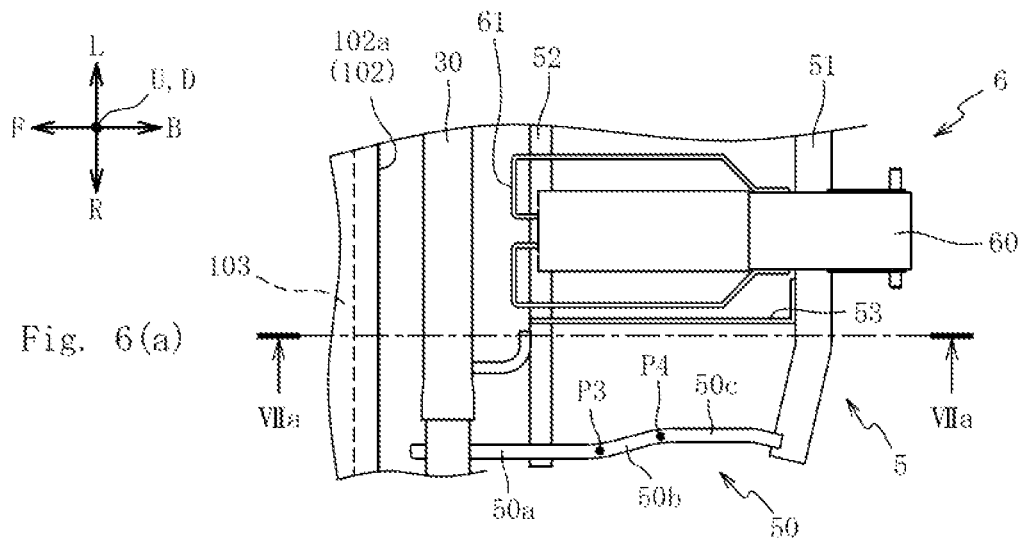
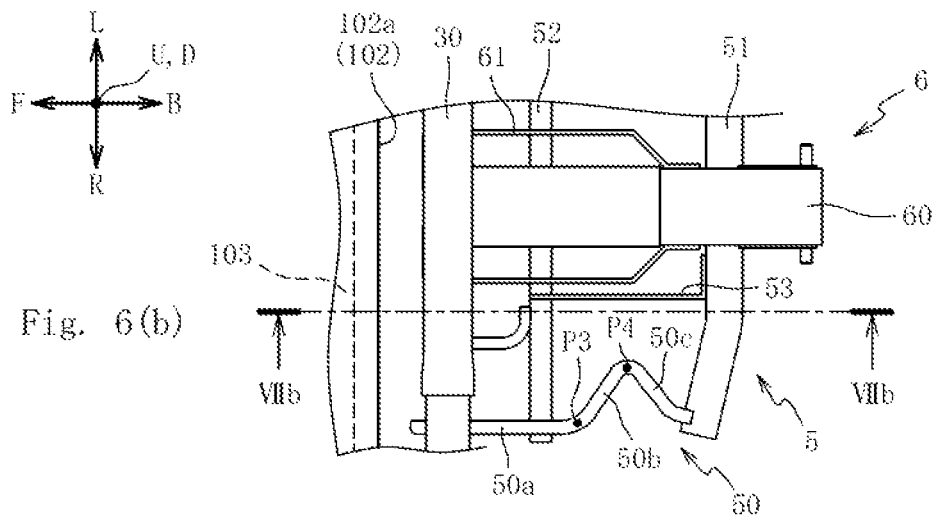
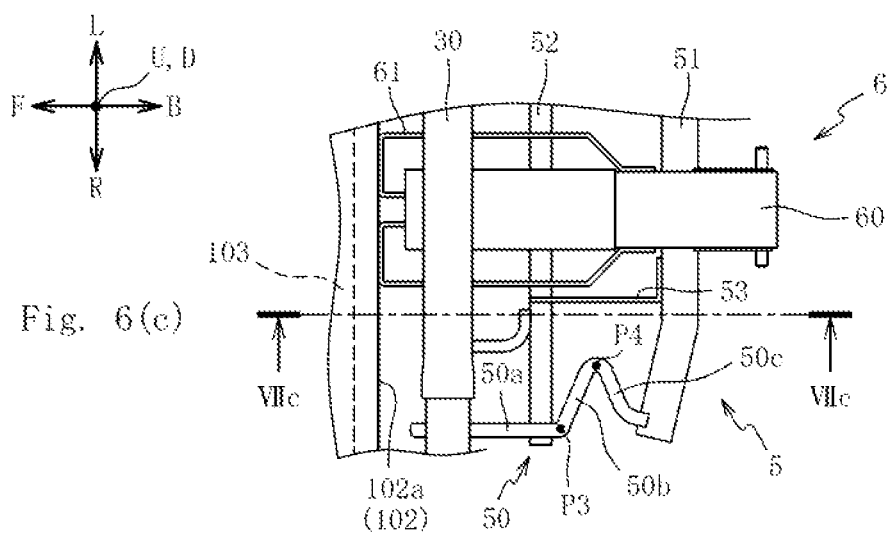

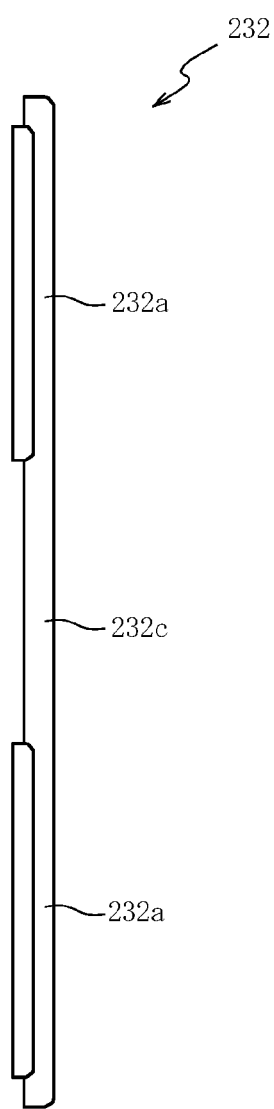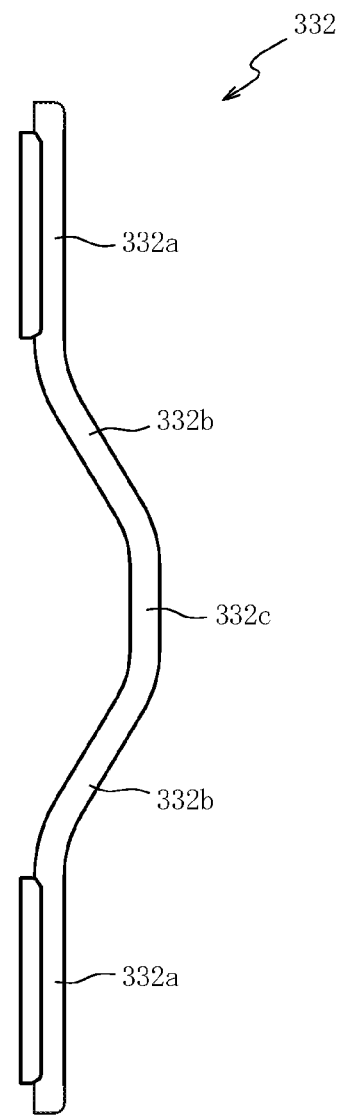
Fig. 8 A          Fig. 8 B

VEHICLE SEAT

TECHNICAL FIELD

The present invention relates to a vehicle seat, and in particular, relates to a vehicle seat that can suppress damage to an on-board object of a vehicle.

BACKGROUND ART

A vehicle seat which is pivotally supported so as to be integrally rotatable in a state where a seat back and a seat cushion are folded and which is rotatable in a folded state between a used position on the front side of a rotation shaft for the rotation and a storage position on the rear side of the rotation shaft, has been known. In the case of a vehicle in which an on-board object (for example, a secondary battery for an electric vehicle, or the like) is stored under the floor on the front side of the storage position, if a rear collision occurs in a state where the seat is stored at the storage position, the load due to the rear collision may act on the on-board object via the seat.

To solve this problem, for example, Patent Document 1 describes a technology for forming an eccentric portion (curved portion) in each of side frames of a seat cushion and a seat back. According to this technology, since the eccentric portion is eccentric outward in the right-left direction of the side frame, the side frame can be deformed outward in the right-left direction by the load at the time of rear collision. Therefore, the load due to the rear collision can be inhibited from acting on the on-board object side via the seat, so that damage to the on-board object can be suppressed.

PRIOR ART DOCUMENT

Patent Document

Patent Document 1: Japanese Patent Application Laid-Open (kokai) No. 2018-094974 (for example, paragraphs 0028 and 0034, FIGS. 5 and 6)

SUMMARY OF THE INVENTION

Problem to be Solved by the Invention

However, in the above-described conventional technology, since each side frame of the seat cushion and the seat back is configured to be deformed outward in the right-left direction, the deformations of the respective side frames may interfere with each other. If deformation of each member (for example, a side frame or a support member) included in the seat cushion or the seat back interferes with each other, the deformation of the seat cushion or the seat back may stop. If the deformation of the seat cushion or the seat back stops, the load at the time of rear collision acts on the on-board object side via the seat, so that there is a problem that damage to the on-board object cannot be sufficiently suppressed.

The present invention has been made to solve the above-described problem, and an object of the present invention is to provide a vehicle seat that can suppress damage to an on-board object of a vehicle.

Means for Solving the Problem

In order to attain the above object, a vehicle seat of the present invention is a vehicle seat including a cushion frame, a back frame, and a rotation shaft pivotally supporting the cushion frame and the back frame such that the cushion frame and the back frame are rotatable around an axis thereof along a right-left direction, wherein the vehicle seat is configured to be rotatable around the rotation shaft between a used position on a front side with respect to the rotation shaft and a storage position on a rear side with respect to the rotation shaft in a state where the back frame is folded to the cushion frame side, the cushion frame and the back frame each include a pair of side frames forming portions on both end sides thereof in the right-left direction and extending in a front-rear direction in the storage state, the side frames each include a base portion forming a portion on one end side in the front-rear direction in the storage state, and an eccentric portion which is eccentric inward or outward in the right-left direction with respect to the base portion in the storage state and for which rigidity against bending in the right-left direction is set so as to be lower than that of the base portion, the vehicle seat is used for a vehicle having an on-board object on the front side of the cushion frame and the back frame in a storage state where the cushion frame and the back frame are stored at the storage position, the eccentric portion is eccentric inward in the right-left direction with respect to the base portion in each side frame of either one of the cushion frame and the back frame, and the eccentric portion is eccentric outward in the right-left direction with respect to the base portion in each side frame of the other of the cushion frame and the back frame.

The vehicle seat of the present invention is also a vehicle seat including a cushion frame, a back frame, and a rotation shaft pivotally supporting the cushion frame and the back frame such that the cushion frame and the back frame are rotatable around an axis thereof along a right-left direction, wherein the vehicle seat is configured to be rotatable around the rotation shaft between a used position on a front side with respect to the rotation shaft and a storage position on a rear side with respect to the rotation shaft in a state where the back frame is folded to the cushion frame side, the cushion frame and the back frame each include a pair of side frames forming portions on both end sides thereof in the right-left direction and extending in a front-rear direction in the storage state, the side frames each include a base portion forming a portion on one end side in the front-rear direction in the storage state, and an eccentric portion which is eccentric inward or outward in the right-left direction with respect to the base portion in the storage state and for which rigidity against bending in the right-left direction is set so as to be lower than that of the base portion, the vehicle seat is used for a vehicle having an on-board object on the front side of the cushion frame and the back frame in a storage state where the cushion frame and the back frame are stored at the storage position, the cushion frame and the back frame each include a first frame and a second frame provided at a predetermined interval in the front-rear direction so as to extend in the right-left direction in the storage state, and a support member extending between the first frame and the second frame and supporting a cushion member between the pair of side frames, and the support member extends between the first frame and the second frame at a position eccentric upward or downward with respect to the first frame and the second frame in the storage state.

Advantageous Effects of the Invention

The vehicle seat according to the first aspect exhibits the following effects. Since the eccentric portion is eccentric inward in the right-left direction with respect to the base portion in each side frame of either one of the cushion frame and the back frame, and the eccentric portion is eccentric outward in the right-left direction with respect to the base portion in each side frame of the other of the cushion frame and the back frame, when the load at the time of rear collision acts, each side frame of either one of the cushion frame and the back frame easily becomes deformed inward in the right-left direction, and each side frame of the other of the cushion frame and the back frame easily becomes deformed outward in the right-left direction.

Accordingly, the deformation direction of each side frame of the cushion frame and the deformation direction of each side frame of the back frame can be easily made opposite to each other in the right-left direction, and the deformations of the side frames can be inhibited from interfering with each other, so that the energy at the time of rear collision can be efficiently absorbed. Therefore, the load at the time of rear collision can be inhibited from acting on the on-board object, so that there is an effect that damage to the on-board object can be suppressed.

The vehicle seat according to the second aspect exhibits the following effects. Since the cushion frame and the back frame each include a first frame and a second frame provided at a predetermined interval in the front-rear direction so as to extend in the right-left direction in the storage state, and the support member extends between the first frame and the second frame at a position eccentric upward or downward with respect to the first frame and the second frame in the storage state, when the load at the time of rear collision acts on the support member, the support member easily becomes deformed in the direction (upward or downward) in which the support member is eccentric with respect to the first frame and the second frame.

Accordingly, when the load at the time of rear collision acts, the deformation direction (deformation in the right-left direction) of the side frame and the deformation direction (deformation in the up-down direction) of the support member can be easily made different from each other. Thus, the deformations of the side frame and the support member can be inhibited from interfering with each other, so that the energy at the time of rear collision can be efficiently absorbed. Therefore, the load at the time of rear collision can be inhibited from acting on the on-board object, so that there is an effect that damage to the on-board object can be suppressed.

In addition to the effects exhibited by the vehicle seat according to the first or second aspect, a vehicle seat according to a third aspect exhibits the following effects. Each side frame includes a connecting portion connecting the base portion and the eccentric portion, the base portion and the eccentric portion of the side frame are disposed at positions where the base portion and the eccentric portion do not overlap in the front-rear direction in the storage state, and rigidity of the connecting portion against bending in the right-left direction is set so as to be lower than that of the base portion of the side frame. Accordingly, when the load at the time of rear collision acts on the side frame, bending in the right-left direction is likely to occur at a connection portion between the base portion and the connecting portion and a connection portion between the connecting portion and the eccentric portion. Therefore, the side frame easily becomes deformed inward or outward in the right-left direction, and the load at the time of rear collision can be more effectively inhibited from acting on the on-board object, so that there is an effect that damage to the on-board object can be suppressed.

In addition to the effects exhibited by the vehicle seat according to any one of the first to third aspects, a vehicle seat according to a fourth aspect exhibits the following effects. The eccentric portion of each side frame includes a low-rigidity portion formed on a center side from both ends thereof in the front-rear direction in the storage state, and rigidity of the eccentric portion of each side frame against bending in the right-left direction is set so as to be lower at the low-rigidity portion than in a region where the low-rigidity portion is not formed. Accordingly, when the load at the time of rear collision acts on the side frame, the low-rigidity portion on the center side from both end portions in the front-rear direction of the eccentric portion easily becomes a starting point of bending in the right-left direction. As a result, the side frame easily becomes deformed inward or outward in the right-left direction, and the load at the time of rear collision can be more effectively inhibited from acting on the on-board object, so that there is an effect that damage to the on-board object can be suppressed.

In addition to the effects exhibited by the vehicle seat according to the fourth aspect, a vehicle seat according to a fifth aspect exhibits the following effects. The low-rigidity portion is formed at a position eccentric in the right-left direction with respect to a center of gravity of the eccentric portion of the side frame, and an eccentric direction of the eccentric portion with respect to the base portion and an eccentric direction of the low-rigidity portion with respect to the eccentric portion in the side frame are set so as to be the same. Accordingly, when the load at the time of rear collision acts on the side frame, the direction in which the eccentric portion is deformed starting from the low-rigidity portion and the direction in which the side frame is deformed starting from the eccentric portion can be easily caused to coincide with each other. Therefore, the side frame easily becomes deformed inward or outward in the right-left direction, and the load at the time of rear collision can be further effectively inhibited from acting on the on-board object, so that there is an effect that damage to the on-board object can be suppressed.

In addition to the effects exhibited by the vehicle seat according to any one of the first to fifth aspects, a vehicle seat according to a sixth aspect exhibits the following effects. A dimension in the right-left direction of each of the side frames of the cushion frame and the back frame is set so as to be smaller than a dimension in an up-down direction and a dimension in the front-rear direction thereof. Therefore, in a used state of being placed at the used position, the rigidity of the side frame against bending in the up-down direction or the front-rear direction due to the load of a seated person can be ensured, whereas the rigidity of the side frame against bending in the right-left direction due to the load at the time of rear collision can be decreased in the storage state. Accordingly, there is an effect that while the strength of the side frame in the used state is ensured, the side frame can be easily deformed when a rear collision occurs in the storage state.

In addition to the effects exhibited by the vehicle seat according to any one of the first to sixth aspects, a vehicle seat according to a seventh aspect exhibits the following effects. A headrest frame pivotally supported by the back frame and configured to be foldable to the back frame in a posture in which a distal end thereof is directed to the front side in the storage state is included. Therefore, when the back frame becomes deformed so as to be compressed in the front-rear direction by the load at the time of rear collision, the headrest frame is displaced toward the front side due to this deformation.

The headrest frame includes a first portion and a second portion for which rigidity is set so as to be lower than that of the first portion and which forms a distal end portion of the headrest frame. Therefore, if the distal end of the headrest frame collides against a front-side wall surface of a storage portion (on-board object) due to displacement of the headrest frame toward the front side, the second portion which is the distal end portion of the headrest frame and having relatively low rigidity can be easily deformed. Due to this deformation, the energy at the time of collision between the front-side wall surface of the storage portion (on-board object) and the headrest frame can be absorbed, so that there is an effect that damage to the on-board object can be suppressed.

In addition to the effects exhibited by the vehicle seat according to the first aspect, a vehicle seat according to an eighth aspect exhibits the following effects. The cushion frame and the back frame each include a support member supporting a cushion member in an opposing interval between the side frames, and an opposing interval in the right-left direction between each side frame of the other of the cushion frame and the back frame and the support member is set so as to be smaller than an opposing interval in the right-left direction between each side frame of the one of the cushion frame and the back frame and the support member. Accordingly, each side frame, of the one of the cushion frame and the back frame, having a relatively large opposing interval in the right-left direction from the support member can be deformed inward in the right-left direction (direction approaching the support member), and each side frame, of the other of the cushion frame and the back frame, having a relatively small opposing interval from the support member can be deformed outward in the right-left direction (direction away from the support member).

Therefore, while the deformation of the side frame of the cushion frame and the deformation of the side frame of the back frame are inhibited from interfering with each other, the deformation of each side frame can be inhibited from interfering with the support member, so that the energy at the time of rear collision can be efficiently absorbed. Therefore, the load at the time of rear collision can be more effectively inhibited from acting on the on-board object, so that there is an effect that damage to the on-board object can be suppressed.

In addition to the effects exhibited by the vehicle seat according to the second aspect, a vehicle seat according to a ninth aspect exhibits the following effects. The support member of the cushion frame is eccentric upward with respect to the first frame and the second frame of the cushion frame in the storage state, and the support member of the back frame is eccentric downward with respect to the first frame and the second frame of the back frame in the storage state. Accordingly, another member can be inhibited from interfering with the deformations of the support members of the cushion frame and the back frame.

That is, in the storage state, the cushion frame is disposed on the upper surface side of the seat in the folded state, and the back frame is disposed on the lower surface side. Therefore, by deforming the support member of the cushion frame upward, and deforming the support member of the back frame downward, the back frame (the side frame or the support member) can be inhibited from interfering with the deformation of the support member of the cushion frame, and the cushion frame (the side frame or the support member) can be inhibited from interfering with the deformation of the support member of the back frame. Accordingly, the energy at the time of rear collision can be efficiently absorbed, and the load at the time of rear collision can be more effectively inhibited from acting on the on-board object, so that there is an effect that damage to the on-board object can be suppressed.

In addition to the effects exhibited by the vehicle seat according to the second aspect, a vehicle seat according to a tenth aspect exhibits the following effects. The support member includes a pair of base portions connected to the first frame and the second frame and forming portions on both end sides thereof in the front-rear direction in the storage state, and an eccentric portion eccentric in the up-down direction with respect to the pair of base portions in the storage state, and rigidity of each base portion of the support member against bending in the up-down direction is set so as to be lower than that of the eccentric portion of the support member. Therefore, when the load at the time of rear collision acts on the cushion frame, the base portion can be easily deformed upward or downward before the eccentric portion is deformed.

The eccentric portion is displaced upward or downward with the deformation of the base portion, so that the support member can be deformed in a state where the eccentric portion is more reliably located above or below the first frame and the second frame. Accordingly, the support member easily becomes deformed upward or downward, and the deformations of the side frame and the support member can be inhibited from interfering with each other, so that the energy at the time of rear collision can be efficiently absorbed. Therefore, the load at the time of rear collision can be more effectively inhibited from acting on the on-board object, so that there is an effect that damage to the on-board object can be suppressed.

BRIEF DESCRIPTION OF THE DRAWINGS

FIG. 6 (*a*) is a partially enlarged top view of a back frame as viewed in a direction VIa in FIG. 3 (*b*), FIG. 6 (*b*) is a partially enlarged top view of the back frame showing a state where a load due to a rear collision is applied from the state of FIG. 6 (a), and FIG. 6 (c) is a partially enlarged top view of the back frame showing a state where a load due to a rear collision is further applied from the state of FIG. 6 (b).

FIG. 8 (a) is a top view showing a first modification of the side frame, and FIG. 8 (b) is a top view showing a second modification of the side frame.

MODES FOR CARRYING OUT THE INVENTION

Figure 1:
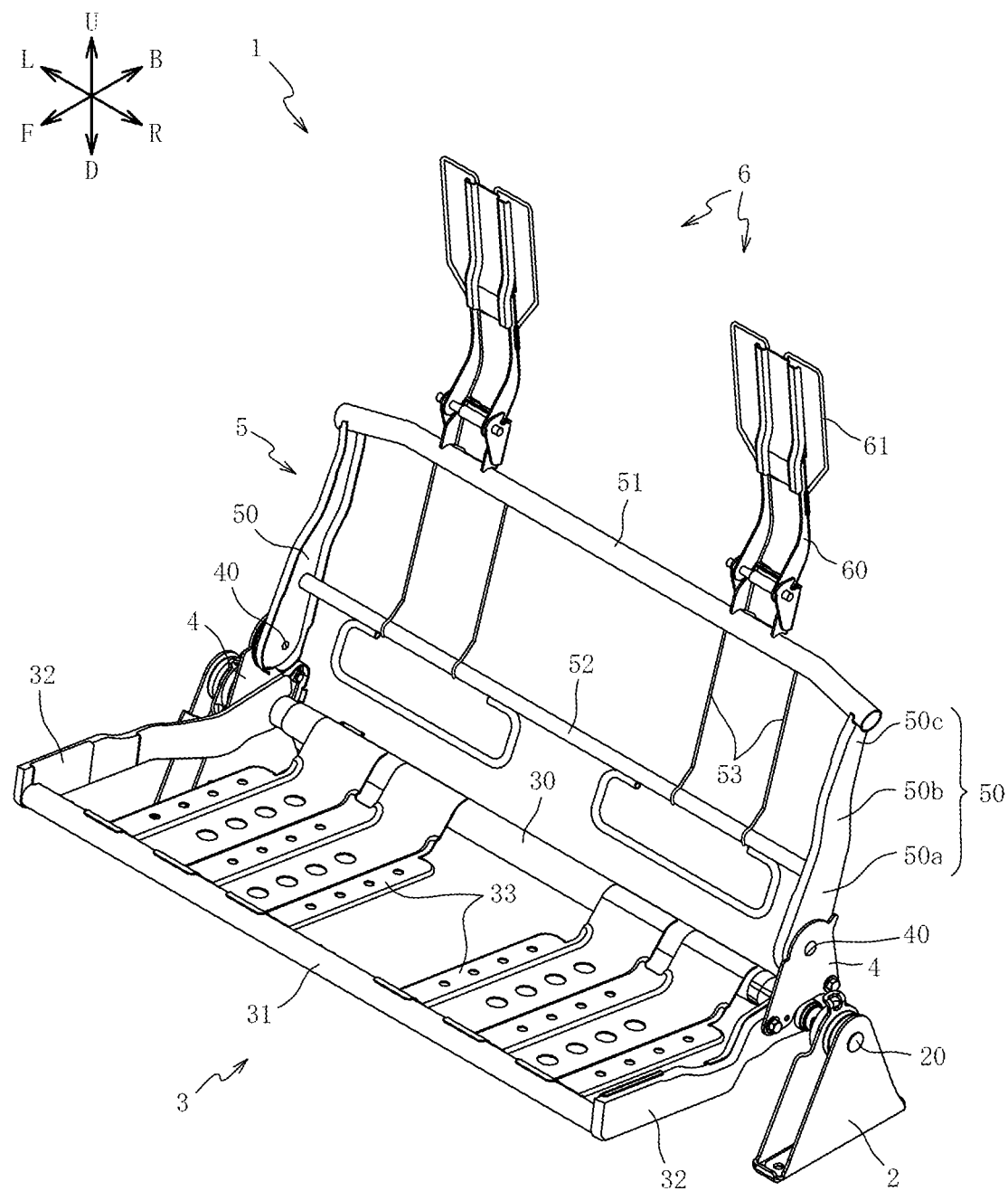
FIG. 1 is a front perspective view of a vehicle seat according to an embodiment of the present invention.

Hereinafter, preferred embodiments of the present invention will be described with reference to the accompanying drawings. First, the overall configuration of a vehicle seat 1 will be described with reference to FIG. 1. FIG. 1 is a front perspective view of the vehicle seat 1 according to an embodiment of the present invention. In FIG. 1, in order to simplify the drawing, a part of the vehicle seat 1 is omitted, and a frame part is schematically shown. In addition, in FIG. 1, the vehicle seat 1 in a state of being placed at a used position (an occupant can be seated thereon) is shown.

An arrow U direction, an arrow D direction, an arrow F direction, an arrow B direction, an arrow L direction, and an arrow R direction in FIG. 1 indicate an upward direction, a downward direction, a forward direction, a backward direction, a leftward direction, and a rightward direction of the vehicle seat 1, respectively. The same applies to FIGS. 2 (a) to 2 (c) and the subsequent drawings.

As shown in FIG. 1, the vehicle seat 1 is a seat mounted on a vehicle (for example, an electric vehicle). The vehicle seat 1 includes first brackets 2 fixed to the vehicle, a cushion frame 3 pivotally supported so as to be rotatable around a rotation shaft 20 of the first brackets 2, second brackets 4 fixed to the rear end (end portion on the arrow B side) of the cushion frame 3, a back frame 5 pivotally supported so as to be rotatable around rotation shafts 40 of the second brackets 4, and headrest frames 6 pivotally supported at the upper end (end portion on the arrow U side) of the back frame 5 so as to be rotatable.

The cushion frame 3 is a metal frame that serves as a skeleton of a seat cushion (which forms a seat surface). The cushion frame 3 includes a rear frame 30 and a front frame 31 disposed at a predetermined interval in the front-rear direction (arrow F-B direction), a pair of side frames 32 connecting the rear frame 30 and the front frame 31 in the front-rear direction, and a pair of panels 33 provided between the pair of side frames 32.

The rear frame 30 forms a portion on the rear end side of the cushion frame 3, and the front frame 31 forms a portion on the front end side of the cushion frame 3. The rear frame 30 and the front frame 31 extend along the right-left direction (arrow L-R direction), and both end portions in the right-left direction of the rear frame 30 and the front frame 31 are connected by the side frames 32. Therefore, the cushion frame 3 is formed in a substantially rectangular shape in a top view (view in the arrow D direction).

Each panel 33 is a member for supporting a cushion member (not shown) made of an elastic foam resin (for example, a flexible polyurethane foam). The panel 33 extends in the front-rear direction between the rear frame 30 and the front frame 31, and the cushion member is supported on the upper surface thereof. The cushion member is covered with a skin (not shown) composed of fabric, synthetic leather, leather, or the like, whereby the seat cushion is formed.

Each second bracket 4 is a member for rotatably supporting the back frame 5 with respect to the cushion frame 3, and is formed in a plate shape using a metal material. The second brackets 4 are fixed to the pair of side frames 32 of the cushion frame 3, respectively, and the back frame 5 is pivotally supported by the rotation shafts 40 of a pair of the second brackets 4.

The back frame 5 is a metal frame that serves as a skeleton of a seat back (which forms a backrest). The back frame 5 includes a pair of side frames 50 forming portions on both right and left end sides thereof, an upper frame 51 and a lower frame 52 connecting the pair of side frames 50 in the right-left direction, and wires 53 extending in the up-down direction between the upper frame 51 and the lower frame 52.

Portions on the upper end side of the pair of side frames 50 are connected by the upper frame 51, and portions on the lower end side (upper side of the rotation shafts 40) of the pair of side frames 50 are connected by the lower frame 52. Therefore, the back frame 5 is formed in a substantially rectangular shape in a front view (view in the arrow B direction).

Each side frame 50 includes a base portion 50a pivotally supported by the second bracket 4 and extending upward from the second bracket 4, a connecting portion 50b extending upward from the upper end of the base portion 50a while being inclined inward in the right-left direction, and an eccentric portion 50c extending upward from the upper end of the connecting portion 50b and connected to the upper frame 51. Since the eccentric portion 50c is connected to the base portion 50a via the connecting portion 50b, the center of gravity of the eccentric portion 50c is located inward in the right-left direction with respect to the center of gravity of the base portion 50a.

The dimension in the right-left direction of the side frame 50 is substantially constant from the lower end to the upper end thereof, and the dimension in the front-rear direction of the side frame 50 is set so as to gradually decrease from the lower end to the upper end thereof. Therefore, the rigidity of the side frame 50 against bending in the right-left direction is the highest at the base portion 50a, and gradually decreases from the connecting portion 50b to the eccentric portion 50c.

Each wire 53 is a member for supporting a cushion member (not shown), the upper end of the wire 53 is connected to the lower surface of the upper frame 51, and the lower end thereof is connected to the front surface of the lower frame 52 so as to be wound therearound. The cushion member is supported by the front surfaces of the wires 53 and covered with a skin (not shown), whereby a seat cushion is formed.

Each headrest frame 6 is a metal frame that serves as a skeleton of a headrest (which forms a pillow for the seat). A cushion member (not shown) is supported by the headrest frame 6 and covered with a skin (not shown), whereby the headrest is formed.

The headrest frame 6 includes a main body portion 60 rotatably provided on the upper frame 51 of the back frame 5, and a wire portion 61 which forms the contour of the headrest while projecting upward from the main body portion 60. The main body portion 60 is a substantially rectangular plate-shaped body that is long in the up-down direction, and the wire portion 61 is a linear wire having a smaller dimension in the right-left direction than the main body portion 60. Therefore, the rigidity of the wire portion 61 is set so as to be lower than that of the main body portion 60.

Next, the detailed configuration of the cushion frame 3 will be described with reference to FIGS. 2 (a) to 2 (c). FIG. 2 (a) is a partially enlarged top view of the cushion frame 3, FIG. 2 (b) is a top view of the disassembled side frame 32 of the cushion frame 3, and FIG. 2 (c) is a partially enlarged cross-sectional view of the cushion frame 3 taken along a line IIc-IIc in FIG. 2 (a).

As shown in FIGS. 2 (a) to 2 (c), the side frame 32 of the cushion frame 3 includes a base portion 32a extending from the rear frame 30 to the front side (arrow F side), a connecting portion 32b extending from the front end of the base portion 32a to the front side while being inclined outward in the right-left direction (arrow L-R direction), and an eccentric portion 32c extending from the front end of the connecting portion 32b to the front side and connected to the front frame 31. Since the eccentric portion 32c is connected to the base portion 32a via the connecting portion 32b, the center of gravity of the eccentric portion 32c is located outward in the right-left direction with respect to the center of gravity of the base portion 32a.

Figures 2A, 2B:
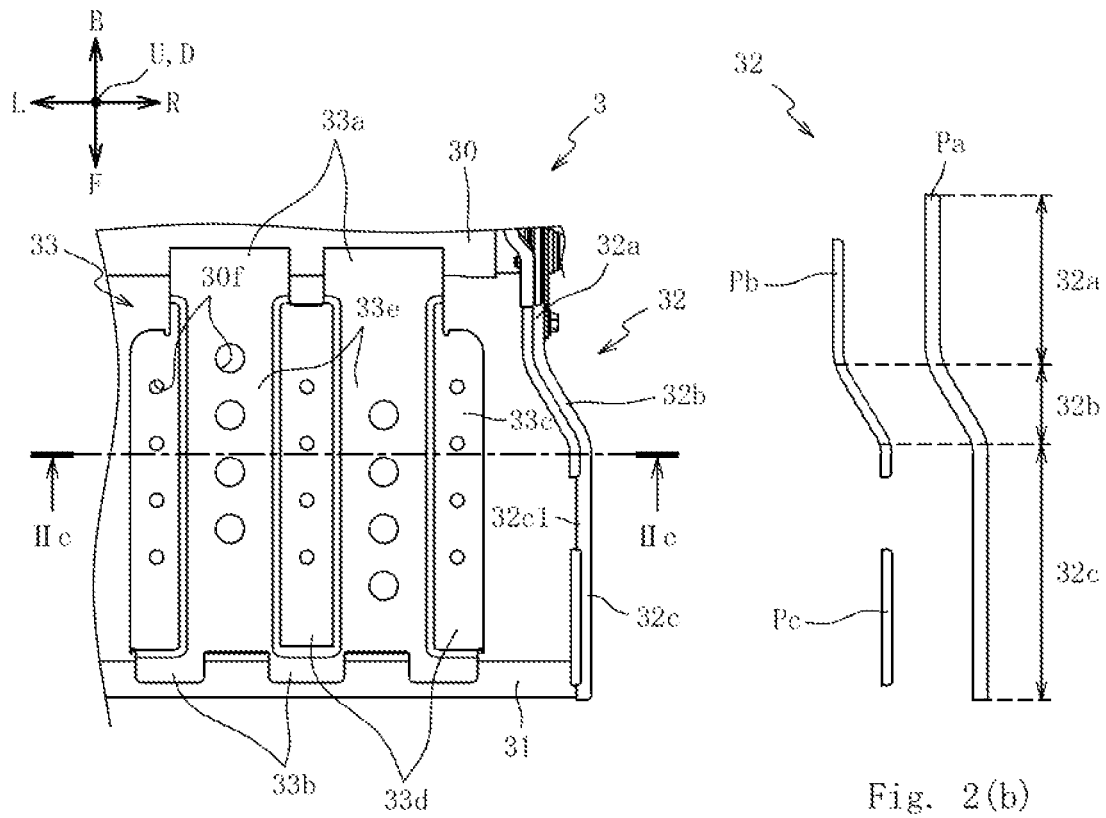
FIG. 2 (*a*) is a partially enlarged top view of a cushion frame, FIG. 2 (*b*) is a top view of a disassembled side frame of the cushion frame, and FIG. 2 (*c*) is a partially enlarged cross-sectional view of the cushion frame taken along a line IIc-IIc in FIG. 2 (*a*).
Figure 2C:
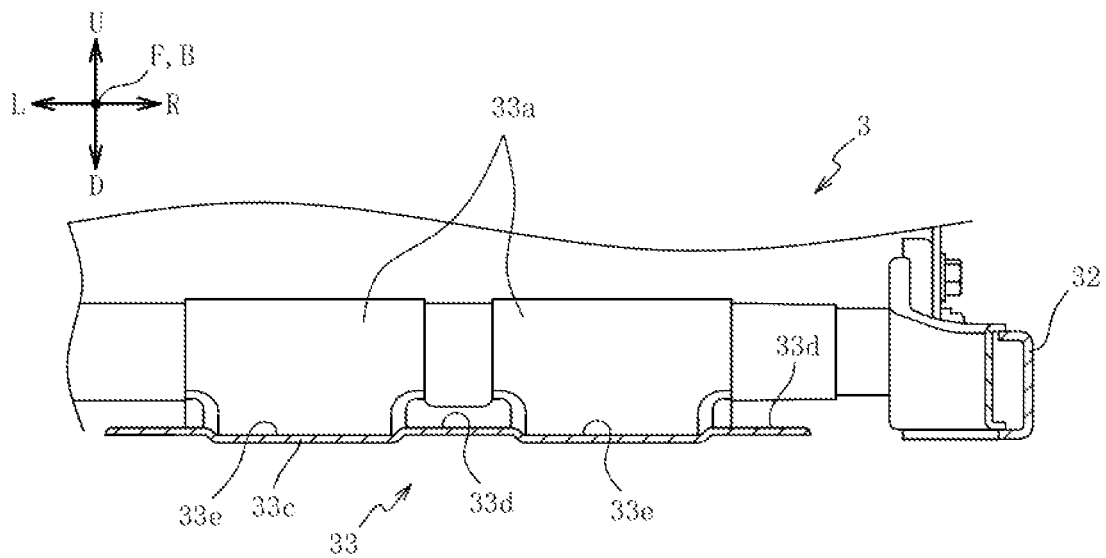

The side frame 32 includes three plates, a first plate Pa to third plate Pc (see FIG. 2(b)), and the first plate Pa to third plate Pc are attached together such that flange portions having a U cross-sectional shape (substantially C shape) are abutted against each other (see the side frame 32 in FIG. 2 (c)).

The first plate Pa integrally forms each outer surface from the rear end of the base portion 32a of the side frame 32 to the front end of the eccentric portion 32c of the side frame 32, and the second plate Pb and the third plate Pc are attached to the inner surface side of the first plate Pa.

The second plate Pb integrally forms the inner surfaces of a region excluding a part on the rear end side of the base portion 32a of the side frame 32, the connecting portion 32b, and a partial region on the rear end side of the eccentric portion 32c, and the third plate Pc forms the inner surface on the front end side of the eccentric portion 32c. That is, in the region forming the eccentric portion 32c, the second plate Pb and the third plate Pc are attached to the first plate Pa in a state of being separated from each other in the front-rear direction, and this region is formed as a low-rigidity portion 32c1 (see FIG. 2 (a)) which has relatively low rigidity, against bending in the right-left direction, in the eccentric portion 32c.

The dimension in the right-left direction of the side frame 32 is substantially constant from the base portion 32a to the eccentric portion 32c in the region where the second plate Pb and the third plate Pc are attached. On the other hand, the dimension in the up-down direction (see FIG. 3 (a)) of the side frame 32 is set so as to be the smallest in the region from the connecting portion 32b to the low-rigidity portion 32c1 of the eccentric portion 32c (region on the center side in the front-rear direction (arrow F-B direction) of the side frame 32).

Each panel 33 of the cushion frame 3 (see FIGS. 2 (a) to 2 (c)) includes a first base portion 33a and a second base portion 33b connected to the rear frame 30 and the front frame 31, respectively, and an eccentric portion 33c connecting the first base portion 33a and the second base portion 33b in the front-rear direction.

The first base portion 33a is inclined downward from the upper surface (surface on the arrow U side of FIG. 2 (b)) of the rear frame 30 toward the front frame 31 side, and the second base portion 33b is inclined downward from the upper surface of the front frame 31 toward the rear frame 30 side. The eccentric portion 33c forms a bottom surface portion of the panel 33 by connecting the lower ends of the first base portion 33a and the second base portion 33b to each other, and the center of gravity of the eccentric portion 33c is located downward with respect to the centers of gravity of the first base portion 33a and the second base portion 33b.

The panel 33 is a plate-shaped body having a constant plate thickness, but is formed so as to have a corrugated cross-sectional shape in which recesses and projections are repeated in the right-left direction, in the eccentric portion 33c and partial regions on the lower end side of the first base portion 33a and the second base portion 33b. Therefore, when each projection portion of the corrugated shape is defined as a projection portion 33d, and each recess portion of the corrugated shape is defined as a recess portion 33e, the projection portions 33d and the recess portions 33e extend from a lower end portion of the first base portion 33a to a lower end portion of the second base portion 33b in a straight manner in the front-rear direction.

A plurality of through holes 33f are provided in each of the projection portions 33d and the recess portions 33e so as to be arranged along the direction in which the projection portions 33d and the recess portions 33e extend (the front-rear direction). The plurality of through holes 33f are formed only in the bottom surface portion (eccentric portion 33c) of the panel 33. In addition, the openings of the through holes 33f formed in each recess portion 33e are set to be larger than those of the through holes 33f formed in each projection portion 33d.

Figure 3A:
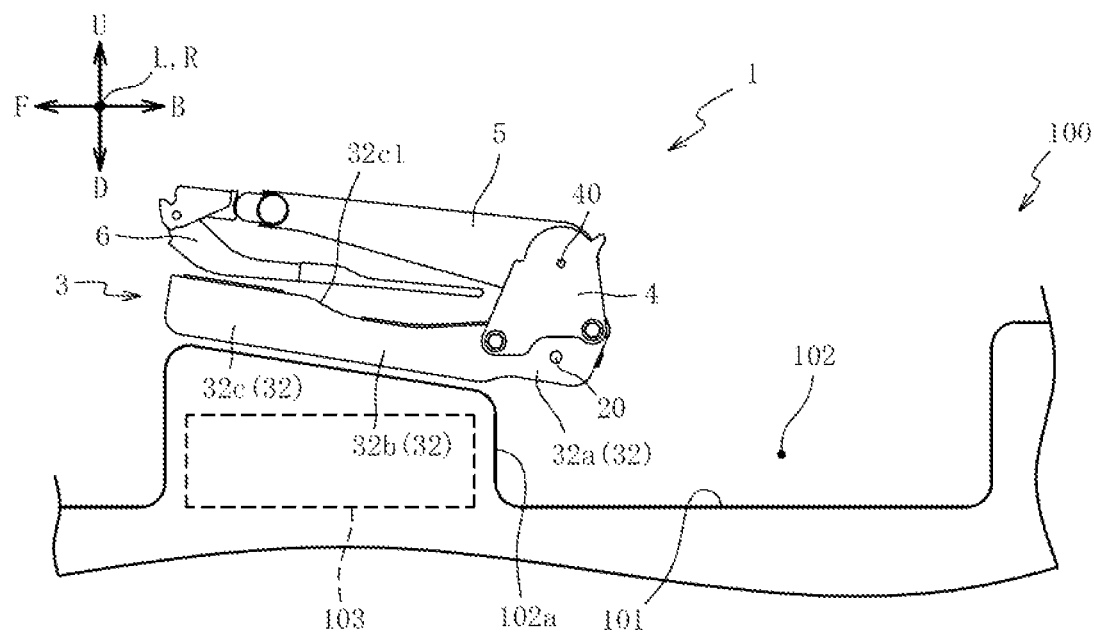
FIG. 3 (*a*) is a side view of the vehicle seat showing a state where each headrest frame and a back frame are folded to the cushion frame side in a state where the vehicle seat is placed at a used position, and FIG. 3 (*b*) is a side view of the vehicle seat showing a state where the vehicle seat is rotated from the state of FIG. 3 (*a*) to a storage position.
Figure 3B:
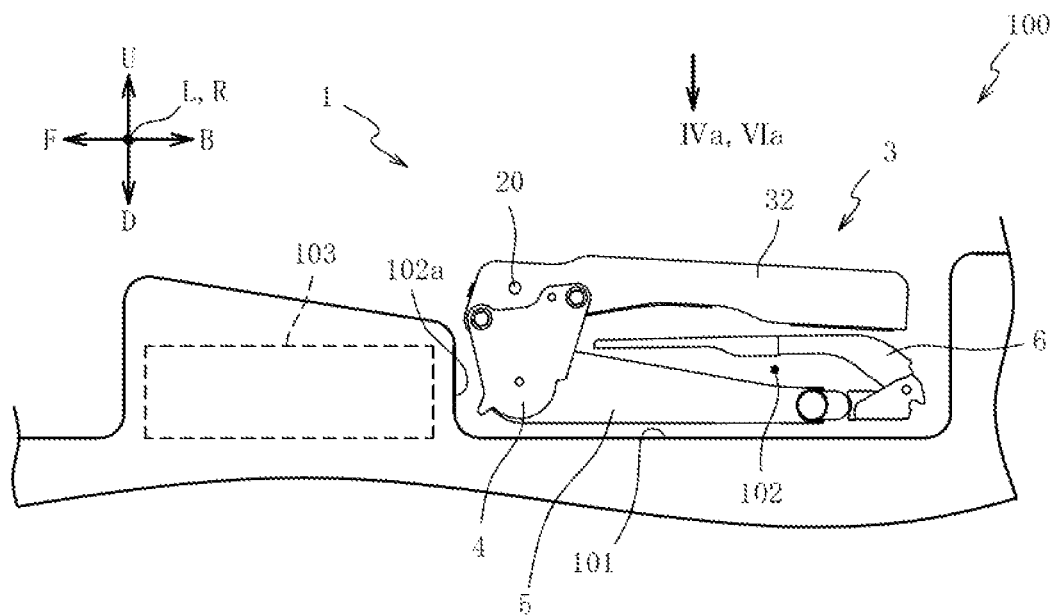

Next, the relationship between the vehicle seat 1 and a vehicle 100 in which the vehicle seat 1 is used will be described with reference to FIGS. 3 (a) and 3 (b). FIG. 3 (a) is a side view of the vehicle seat 1 showing a state where the back frame 5 and each headrest frame 6 are folded to the cushion frame 3 side in a state where the vehicle seat 1 is placed at the used position, and FIG. 3 (b) is a side view of the vehicle seat 1 showing a state where the vehicle seat 1 is rotated from the state of FIG. 3 (a) to a storage position. In FIGS. 3 (a) and 3 (b), in order to simplify the drawing, the vehicle seat 1 is shown such that a part thereof (for example, the first bracket 2 supporting the rotation shaft 20 (see FIG. 1)) is omitted, and the vehicle 100 is schematically shown such that hatching of a cross-section thereof is omitted.

As shown in FIGS. 3 (a) and 3 (b), the vehicle seat 1 is fixed to a floor surface 101 of the vehicle 100 in a state where the cushion frame 3 is rotatable around the rotation shaft 20. Since the back frame 5 is pivotally supported (fixed) to the cushion frame 3 via the rotation shaft 40 of the second bracket 4 so as to be rotatable, the back frame 5 can be folded to the upper surface (surface on the arrow U side in FIG. 3 (a)) of the cushion frame 3 at the used position.

Also, since the headrest frames 6 are pivotally supported (fixed) at an end portion of the back frame 5 so as to be rotatable, a folded state where the headrest frames 6 are placed between the cushion frame 3 and the back frame 5 can be obtained by folding the back frame 5 having the headrest frames 6 folded on the front surface side, to the cushion frame 3 side. By rotating the vehicle seat 1 in this folded state around the rotation shaft 20, the vehicle seat 1 can be placed at each of the used position on the front side with respect to the rotation shaft 20 (state of FIG. 3 (a)) and the storage position on the rear side with respect to the rotation shaft 20 (state of FIG. 3 (b)).

In the vehicle 100 to which the vehicle seat 1 is fixed, a storage portion 102 is formed on the floor surface 101 on the rear side (arrow B side) with respect to the rotation shaft 20 so as to be recessed downward. By rotating the vehicle seat 1 toward the storage portion 102 side (storage position), the vehicle seat 1 in the folded state can be stored in the storage portion 102 (see FIG. 3 (b)).

An on-board object 103 is mounted under a floor below the vehicle seat 1 at the used position, that is, under a floor on the front side (arrow F side) of the storage portion 102. Thus, if a rear collision occurs at the vehicle 100 in a storage state where the vehicle seat 1 is stored in the storage portion 102, the on-board object 103 may be damaged. Therefore, for example, if the on-board object 103 is a secondary battery for an electric vehicle, a fuel cell for a fuel cell vehicle, or the like, there is a risk of danger occurring due to damage to the on-board object 103.

On the other hand, the vehicle seat 1 of the present embodiment is configured such that damage to the on-board object 103 can be suppressed even if a rear collision occurs in a storage state where the vehicle seat 1 is stored in the storage portion 102. This configuration will be described with reference to FIG. 4 (a) to FIG. 6 (c). In the following description, a state where the vehicle seat 1 is stored in the storage portion 102 is referred to simply as a "storage state".

Figure 4A:
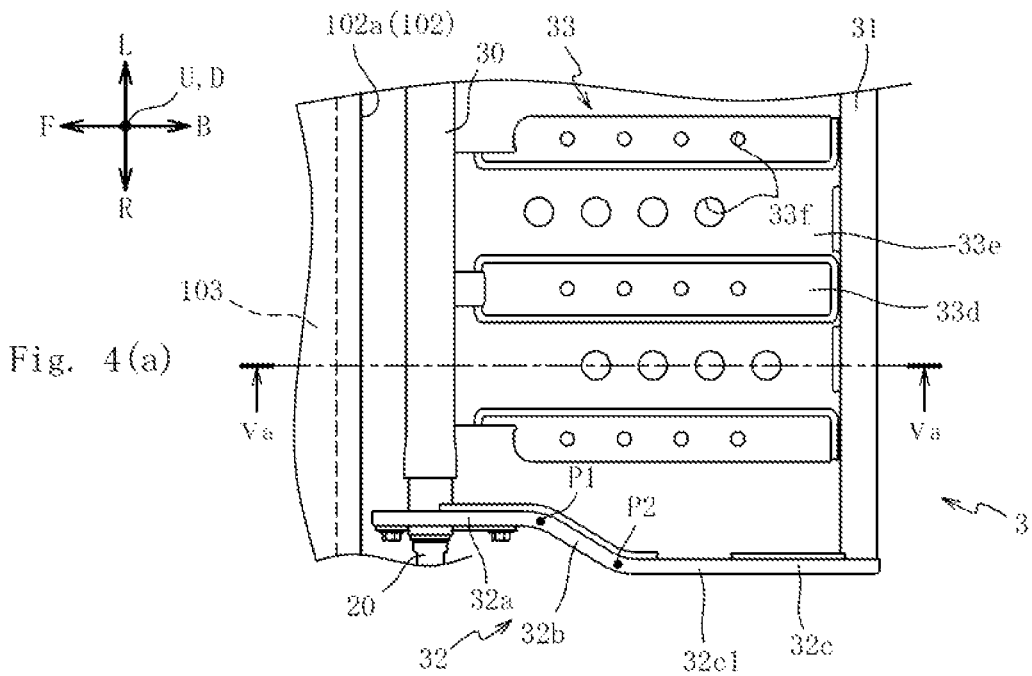
FIG. 4 (*a*) is a partially enlarged top view of the cushion frame as viewed in a direction IVa in FIG. 3 (*b*), FIG. 4 (*b*) is a partially enlarged top view of the cushion frame showing a state where a load due to a rear collision is applied from the state of FIG. 4 (*a*), and FIG. 4 (*c*) is a partially enlarged top view of the cushion frame in a state where a load due to a rear collision is further applied from the state of FIG. 4 (*b*).
Figure 4B:
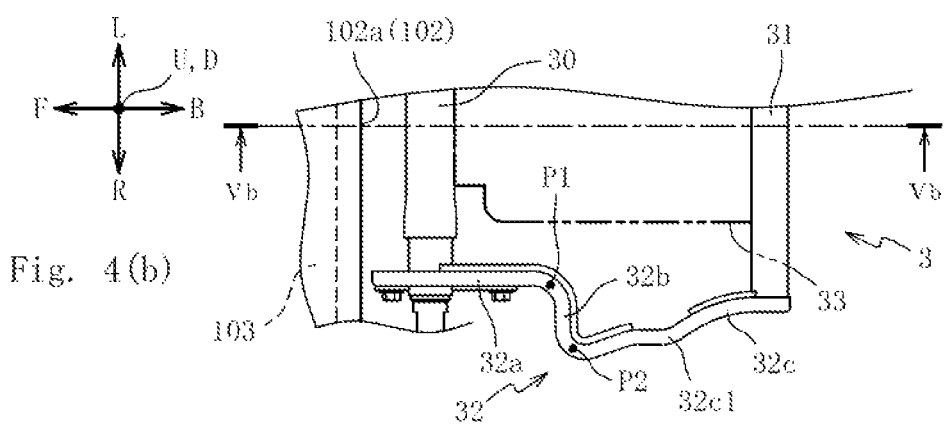
Figure 4C:
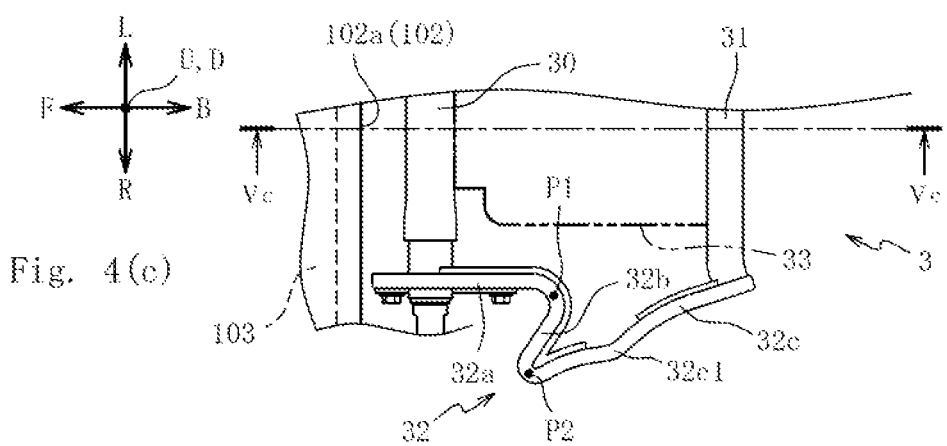

First, a deformation mode of the cushion frame 3 when a rear collision occurs in the storage state will be described with reference to FIG. 4 (a) to FIG. 5 (c). FIG. 4 (a) is a partially enlarged top view of the cushion frame 3 as viewed in a direction IVa in FIG. 3(b), FIG. 4 (b) is a partially enlarged top view of the cushion frame 3 showing a state where the load due to a rear collision is applied from the state of FIG. 4 (a), and FIG. 4 (c) is a partially enlarged top view of the cushion frame 3 showing a state where the load due to a rear collision is further applied from the state of FIG. 4 (b).

Figure 5A:
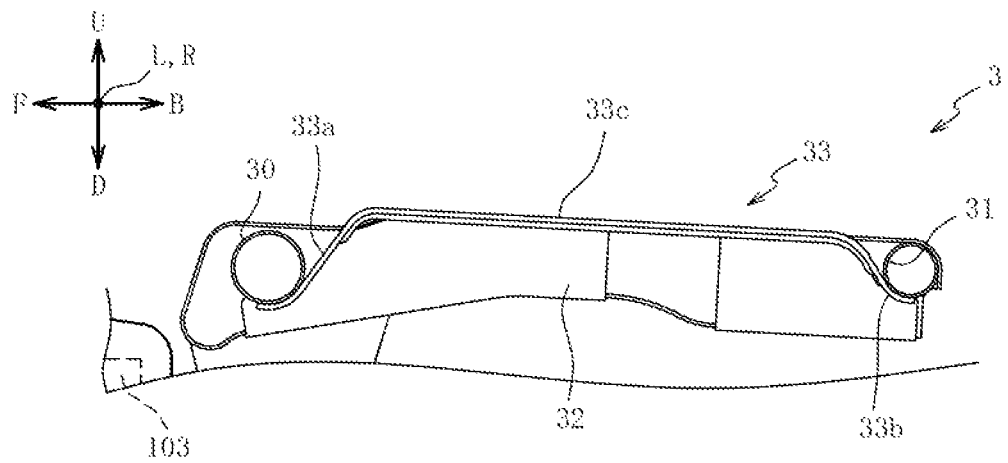
FIG. 5 (*a*) is a partially enlarged cross-sectional view of the cushion frame taken along a line Va-Va in FIG. 4 (*a*), FIG. 5 (*b*) is a partially enlarged cross-sectional view of the cushion frame taken along a line Vb-Vb in FIG. 4 (*b*), and FIG. 5 (*c*) is a partially enlarged cross-sectional view of the cushion frame taken along a line Vc-Vc in FIG. 4 (*c*).
Figure 5B:
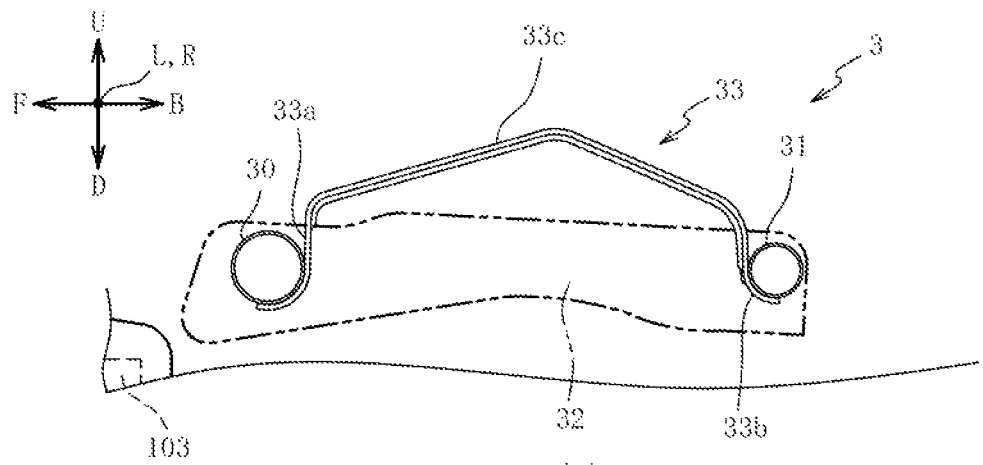
Figure 5C:
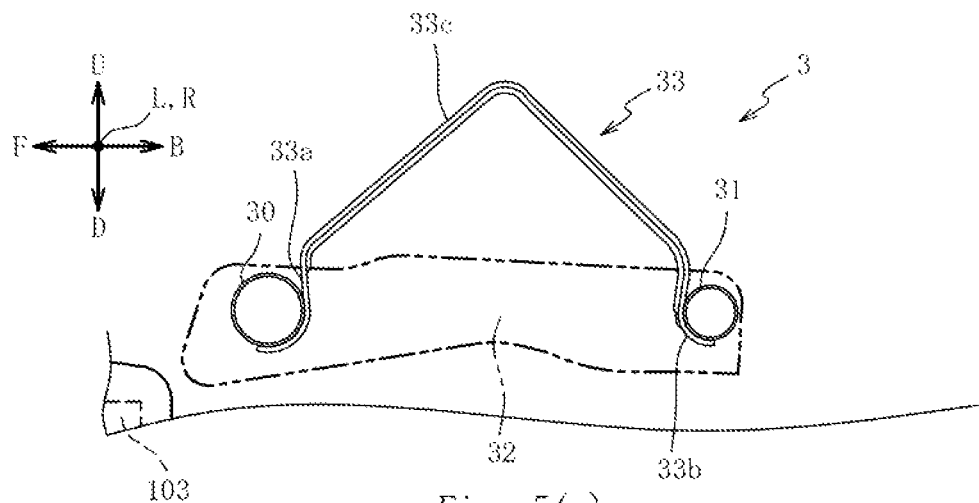

FIG. 5 (a) is a partially enlarged cross-sectional view of the cushion frame 3 taken along a line Va-Va in FIG. 4 (a), FIG. 5 (b) is a partially enlarged cross-sectional view of the cushion frame 3 taken along a line Vb-Vb in FIG. 4 (b), and FIG. 5 (c) is a partially enlarged cross-sectional view of the cushion frame 3 taken along a line Vc-Vc in FIG. 4 (c).

In FIG. 4 (a) to FIG. 5 (c), a part of the vehicle seat 1 (for example, the back frame 5, the headrest frame 6, etc.) is not shown, and in FIGS. 5 (a) to 5 (c), hatching of a cross-section of the panel 33 is not shown. In addition, in FIGS. 4 (a) to 4 (c), the panel 33 in the middle of deformation is shown by a two-dot chain line, and in FIGS. 5 (a) to 5 (c), the side frame 32 in the middle of deformation is shown by a two-dot chain line.

As shown in FIG. 4 (a), in the storage state (state before the load due to a rear collision is applied), the rear frame 30 of the cushion frame 3 is located on the front side (arrow F side), and the front frame 31 is located on the rear side (arrow B side). The rear frame 30 has rigidity relatively increased by being fixed to the vehicle body side via the rotation shaft 20. Thus, when the load toward the front at the time of rear collision is applied to the front frame 31, the rear frame 30 serves as a support and a compressive load occurs at the side frame 32 and the panel 33 which connect the rear frame 30 and the front frame 31 in the front-rear direction.

In the state before deformation in which the compressive load is applied, since the eccentric portion 32c is eccentric outward in the right-left direction (arrow L-R direction) with respect to the base portion 32a of the side frame 32, when the load at the time of rear collision acts on the side frame 32, the side frame 32 easily becomes plastically deformed such that the eccentric portion 32c is displaced outward in the right-left direction as shown in FIG. 4 (b) and FIG. 4 (c).

By the deformation of the side frame 32, the energy at the time of rear collision can be absorbed. Furthermore, since the deformation direction of the side frame 32 is the outward direction in the right-left direction, the side frame 32 can be inhibited from becoming deformed so as to reach a front-side wall surface 102a side of the storage portion 102 (on-board object 103 side). Accordingly, the load at the time of rear collision can be inhibited from acting on the on-board object 103. Thus, for example, even if the on-board object 103 is a secondary battery, a fuel cell, or the like, the occurrence of danger due to damage to the on-board object 103 can be suppressed, so that the safety can be improved.

In this case, if the purpose is simply to deform the side frame 32 to inhibit reaching the on-board object 103 side, for example, it is possible to adopt a configuration in which the eccentric portion 32c of the side frame 32 is eccentric inward in the right-left direction. However, in such a configuration, another member such as the panel 33 located inward in the right-left direction with respect to the side frame 32, the back frame 5 (see FIGS. 3 (a) and 3 (b)), or the headrest frame 6 may interfere with the deformation of the side frame 32. If the deformation of the side frame 32 is interfered with (the deformation of the cushion frame 3 stops), the energy at the time of rear collision cannot be absorbed, and the load due to the rear collision may act on the on-board object 103 side via the cushion frame 3.

On the other hand, in the present embodiment, the eccentric portion 32c is eccentric outward in the right-left direction with respect to the base portion 32a, and the eccentric portion 32c of the side frame 32 is deformed outward in the right-left direction. Another member can be inhibited from interfering with this deformation. Therefore, the energy at the time of rear collision can be efficiently absorbed, so that the load due to the rear collision can be inhibited from acting on the on-board object 103 side via the cushion frame 3.

Here, the rigidity of the side frame 32 against right and left bending tends to be relatively high on the rear end side of the base portion 32a, which is a connection portion with the rear frame 30, and on the front end side of the eccentric portion 32c, which is a connection portion with the front frame 31, but tends to be lower at the connecting portion 32b, which is located on the center side in the front-rear direction of the side frame 32, and in a region on the rear end side of the eccentric portion 32c (low-rigidity portion 32c1).

On the other hand, since the second bracket 4 (see FIGS. 3 (a) and 3 (b)) is fixed to the base portion 32a of the side frame 32, the rigidity of the side frame 32 against right and left bending is higher at the base portion 32a than on the front end side of the eccentric portion 32c. In addition, since the dimension in the up-down direction (arrow U-D direction) of the side frame 32 (see FIGS. 3 (a) and 3 (b)) is set so as to be the smallest in the region from the connecting portion 32b to the low-rigidity portion 32c1 of the eccentric portion 32c as described above, the rigidity (section modulus) of the side frame 32 against right and left bending is the lowest in this region.

That is, the rigidity of the side frame 32 against right and left bending is the highest at the base portion 32a, and is smaller in the order of the front end side of the eccentric portion 32c, the connecting portion 32b, and the low-rigidity portion 32c1 of the eccentric portion 32c.

Therefore, since the rigidity of the eccentric portion 32c against right and left bending is lower than that of the base portion 32a, when the load at the time of rear collision acts on the side frame 32 (see FIG. 4 (b) and FIG. 4 (c)), right and left bending is less likely to occur at the base portion 32a, but is more likely to occur at the eccentric portion 32c. Therefore, the side frame 32 more easily becomes deformed outward in the right-left direction.

Moreover, the low-rigidity portion 32c1 is formed on the center side of the eccentric portion 32c from both ends in the front-rear direction, and the rigidity of the eccentric portion 32c against bending in the right-left direction is the lowest at the low-rigidity portion 32c1 as compared to that in the region where the low-rigidity portion 32c1 is not formed. Therefore, the low-rigidity portion 32c1 of the eccentric portion 32c easily becomes a starting point of bending in the right-left direction, so that the side frame 32 more easily becomes deformed outward in the right-left direction.

Also, in the state before deformation (see FIG. 4 (a)), the low-rigidity portion 32c1 is formed at a position eccentric outward in the right-left direction with respect to the center of gravity of the eccentric portion 32c, and the eccentric direction of the eccentric portion 32c with respect to the base portion 32a (outward eccentricity in the right-left direction) and the eccentric direction of the low-rigidity portion 32c1 with respect to the eccentric portion 32c (outward eccentricity in the right-left direction) are the same. Accordingly, the deformation direction in which the eccentric portion 32c is deformed outward in the right-left direction starting from the low-rigidity portion 32c1 and the deformation direction in which the side frame 32 is deformed outward in the right-left direction starting from the eccentric portion 32c can be caused to coincide with each other. Therefore, the side frame 32 more easily becomes deformed outward in the right-left direction.

As described above, in order to easily deform the side frame 32 outward in the right-left direction (control the direction of deformation), the eccentric portion 32c having relatively low rigidity against right and left bending may be eccentric outward in the right-left direction with respect to the base portion 32a. However, even in the configuration in which the eccentric portion 32c is eccentric outward in the right-left direction with respect to the base portion 32a, if the base portion 32a and the eccentric portion 32c are disposed at positions where the base portion 32a and the eccentric portion 32c partially overlap in the front-rear direction, the eccentric portion 32c of the side frame 32 may become deformed inward in the right-left direction.

On the other hand, in the present embodiment, in the state before deformation (see FIG. 4 (a)), the connecting portion 32b extends from the front end of the base portion 32a to the rear side while being inclined outward in the right-left direction, and the eccentric portion 32c is connected to the base portion 32a via the connecting portion 32b, so that the base portion 32a and the eccentric portion 32c are disposed at positions where the base portion 32a and the eccentric portion 32c do not overlap in the front-rear direction. Accordingly, in the state before deformation, a connection portion P1 between the base portion 32a and the connecting portion 32b and a connection portion P2 between the connecting portion 32b and the eccentric portion 32c have a curved shape.

Therefore, when the load at the time of rear collision acts on the side frame 32 (see FIG. 4 (b) and FIG. 4 (c)), stress is concentrated on the connection portion P1 between the base portion 32a and the connecting portion 32b and the connection portion P2 between the connecting portion 32b and the eccentric portion 32c, and bending is likely to occur at the connection portions P1 and P2. In addition, since the rigidity of the connecting portion 32b and the eccentric portion 32c against bending in the right-left direction is lower than that of the base portion 32a, bending is more likely to occur at the connection portion P1 between the base portion 32a and the connecting portion 32b and the connection portion P2 between the connecting portion 32b and the eccentric portion 32c.

Also, as described above, the rigidity of the side frame 32 against right and left bending is set so as to be the lowest at the low-rigidity portion 32c1 of the eccentric portion 32c, and the low-rigidity portion 32c1 is formed at a position eccentric outward in the right-left direction with respect to the center of gravity of the eccentric portion 32c. Therefore, in the initial stage when the load at the time of rear collision acts on the side frame 32, the low-rigidity portion 32c1 easily first becomes deformed outward in the right-left direction. When outward bending in the right-left direction occurs at the low-rigidity portion 32c1, the connecting portion 32b easily becomes deformed starting from the connection portion P1 between the base portion 32a and the connecting portion 32b so as to be folded outward, so that bending is more likely to occur at the connection portion P1 between the base portion 32a and the connecting portion 32b.

By making right and left bending to be likely to occur at the connection portion P1 between the base portion 32a and the connecting portion 32b and the connection portion P2 between the connecting portion 32b and the eccentric portion 32c while suppressing the occurrence of right and left bending at the base portion 32a as described above, the side frame 32 can be reliably deformed outward in the right-left direction.

As shown in FIG. 5 (a), in the panel 33 of the cushion frame 3 in the storage state (state before deformation), the first base portion 33a and the second base portion 33b are inclined upward from the lower surfaces of the rear frame 30 and the front frame 31 toward the opposing interval between the rear frame 30 and the front frame 31. The eccentric portion 33c, which connects the upper end portions of the first base portion 33a and the second base portion 33b in the front-rear direction, is located above the rear frame 30 and the front frame 31.

That is, in the state before deformation, since the center of gravity of the eccentric portion 33c is located above a straight line connecting the upper ends of the rear frame 30 and the front frame 31 to each other, when the load at the time of rear collision acts on the panel 33 (see FIG. 5 (b) and FIG. 5 (c)), the panel 33 can be deformed in a state where the eccentric portion 33c is always located above the rear frame 30 and the front frame 31. Accordingly, the eccentric portion 33c can be easily deformed upward.

By the deformation of the eccentric portion 33c of the panel 33, the energy at the time of rear collision can be absorbed. Furthermore, since the deformation direction of the eccentric portion 33c is the upward direction, the eccentric portion 33c of the panel 33 can be inhibited from becoming deformed so as to reach the front-side wall surface 102a side of the storage portion 102 (on-board object 103 side). Accordingly, the load at the time of rear collision can be inhibited from acting on the on-board object 103, so that damage to the on-board object 103 can be suppressed.

Also, in the state before deformation (see FIG. 5 (a)), since the first base portion 33a and the second base portion 33b are inclined upward from the rear frame 30 and the front frame 31 toward the center side of the panel 33, when the load at the time of rear collision acts on the panel 33, deformation of upward bending (deformation in which rotation is made around the rear frame 30 or the front frame 31) is likely to occur at the first base portion 33a and the second base portion 33b. The eccentric portion 33c is displaced upward with the deformation of the first base portion 33a and the second base portion 33b, so that the panel 33 can be deformed in a state where the eccentric portion 33c is more reliably located above the rear frame 30 and the front frame 31. Therefore, the eccentric portion 33c can be easily deformed upward.

Here, since the through holes 33f (see FIG. 4 (a)) are formed in the eccentric portion 33c, the rigidity (section modulus) of the eccentric portion 33c against bending in the up-down direction is slightly lower. However, since the projection portions 33d and the recess portions 33e of the corrugated shape are formed in the eccentric portion 33c to both ends thereof in the front-rear direction, the rigidity of the eccentric portion 33c against bending in the up-down direction is higher than at the first base portion 33a and the second base portion 33b (the region in which the projection portions 33d and the recess portions 33e are not formed).

Therefore, in the initial stage when the load at the time of rear collision acts on the panel 33, the first base portion 33a and the second base portion 33b easily become deformed upward before the eccentric portion 33c. Accordingly, the panel 33 can be deformed in a state where the eccentric portion 33c is more reliably located above the rear frame 30 and the front frame 31. Therefore, the panel 33 can be easily deformed upward.

As described above, by deforming the panel 33 upward, another member located below the panel 33 (for example, the back frame 5 (see FIGS. 3 (a) and 3 (b)) or the headrest frame 6) can be inhibited from interfering with the deformation of the panel 33 (stop of the deformation of the cushion frame 3 can be inhibited). Therefore, the energy at the time of rear collision can be efficiently absorbed, so that the load due to the rear collision can be inhibited from acting on the on-board object 103 side via the cushion frame 3.

Also, as described above, whereas the eccentric portion 32c of the side frame 32 becomes deformed outward in the right-left direction since the eccentric portion 32c is eccentric outward in the right-left direction with respect to the base portion 32a (see FIGS. 4 (a) to 4 (c)), the eccentric portion 33c becomes deformed upward since the eccentric portion 33c of the panel 33 is eccentric upward with respect to the first base portion 33a and the second base portion 33b. Thus, the deformation direction of the side frame 32 and the deformation direction of the panel 33 are different from each other. Accordingly, the deformation of the side frame 32 and the deformation of the panel 33 can be inhibited from interfering with each other, so that the energy at the time of rear collision can be efficiently absorbed.

Next, a deformation mode of the back frame 5 when a rear collision occurs in the storage state will be described with reference to FIG. 6 (a) to FIG. 7 (c). FIG. 6 (a) is a partially enlarged top view of the back frame 5 as viewed in a direction VIa in FIG. 3 (b), FIG. 6 (b) is a partially enlarged top view of the back frame 5 showing a state where the load due to a rear collision is applied from the state of FIG. 6 (a), and FIG. 6 (c) is a partially enlarged top view of the back frame 5 showing a state where the load due to a rear collision is further applied from the state of FIG. 6 (b).

Figure 7A:
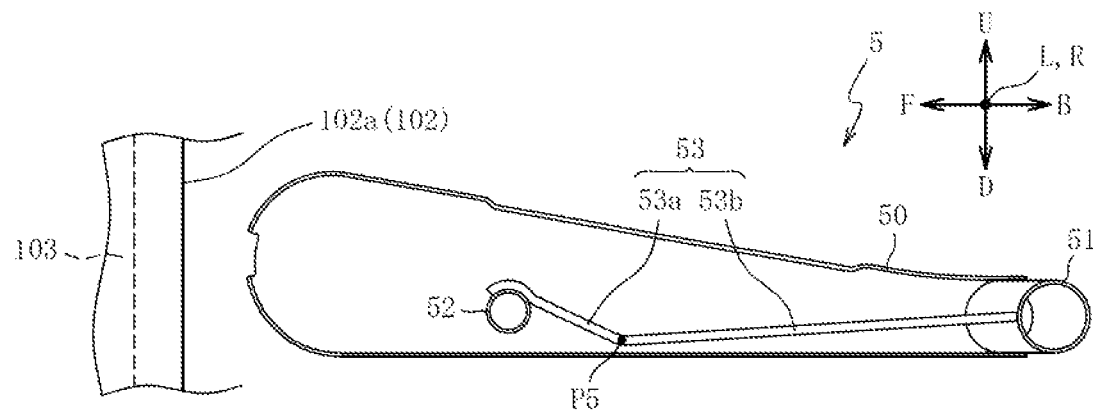
FIG. 7 (a) is a partially enlarged cross-sectional view of the back frame taken along a line VIIa-VIIa in FIG. 6 (a), FIG. 7 (b) is a partially enlarged cross-sectional view of the back frame taken along a line VIIb-VIIb in FIG. 6 (b), and FIG. 7 (c) is a partially enlarged cross-sectional view of the back frame taken along a line VIIc-VIIc in FIG. 6 (c).
Figure 7B:
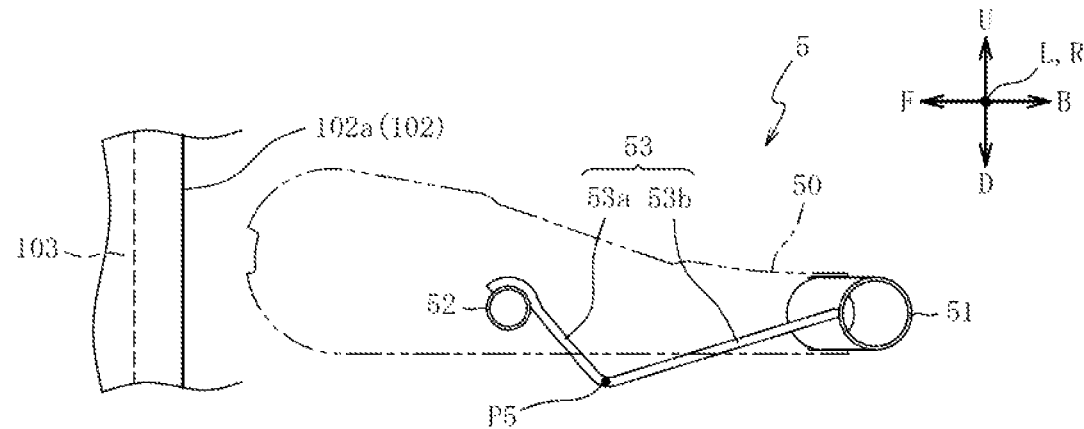
Figure 7C:
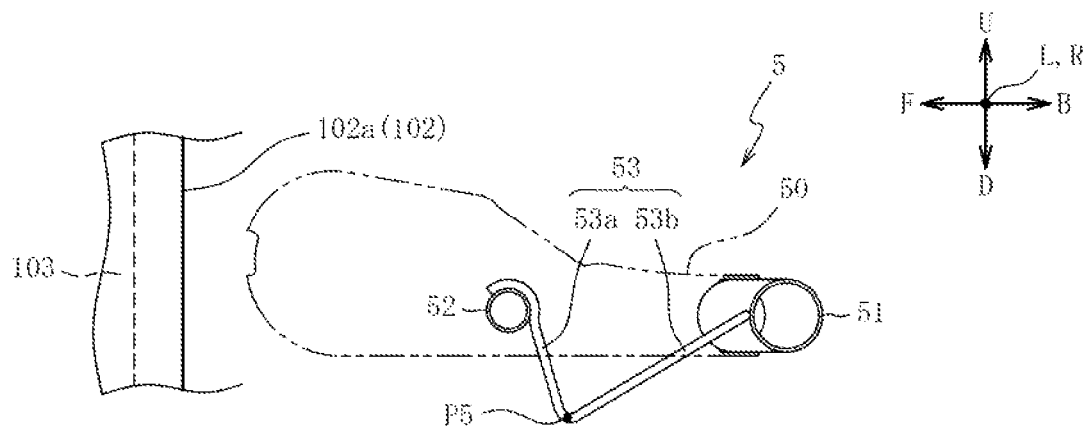

FIG. 7 (a) is a partially enlarged cross-sectional view of the back frame 5 taken along a line VIIa-VIIa in FIG. 6 (a), FIG. 7 (b) is a partially enlarged cross-sectional view of the back frame 5 taken along a line VIIb-VIIb in FIG. 6 (b), and FIG. 7 (c) is a partially enlarged cross-sectional view of the back frame 5 taken along a line VIIc-VIIc in FIG. 6 (c).

In FIG. 6 (a) to FIG. 7 (c), a part of the vehicle seat 1 (for example, the side frame 32 of the cushion frame 3, the panel 33, etc.) is not shown. In addition, in FIGS. 7 (a) to 7 (c), the side frame 50 in the middle of deformation is shown by a two-dot chain line.

As shown in FIG. 6 (a), in the storage state, the lower frame 52 of the back frame 5 is located on the front side (arrow F side), the upper frame 51 is located on the rear side (arrow B side), and the side frame 50 connects the upper frame 51 and the lower frame 52 in the front-rear direction.

The side frame 50 is connected to the rear frame 30 (see FIG. 6 (a)) via the second bracket 4 (see FIG. 3 (b)) and the side frame 32. Therefore, when the load toward the front at the time of rear collision is applied to the upper frame 51 (headrest frame 6), the rear frame 30 serves as a support, and a compressive load occurs at the side frame 50 and the wire 53.

In the state before deformation, since the eccentric portion 50c of the side frame 50 is eccentric inward in the right-left direction (arrow L-R direction) with respect to the base portion 50a, when the load at the time of rear collision acts on the side frame 50 (see FIG. 6 (b) and FIG. 6 (c)), the eccentric portion 50c easily becomes plastically deformed inward in the right-left direction. By the deformation of the eccentric portion 50c of the side frame 50, the energy at the time of rear collision can be absorbed. Furthermore, since the deformation direction of the eccentric portion 50c is the inward direction in the right-left direction, the side frame 50 can be inhibited from becoming deformed so as to reach the front-side wall surface 102a side of the storage portion 102 (on-board object 103 side). Accordingly, the load at the time of rear collision can be inhibited from acting on the on-board object 103.

Moreover, the rigidity of the side frame 50 against right and left bending is the highest at the base portion 50a, and is smaller in the order of the connecting portion 50b and the eccentric portion 50c. Therefore, when the load at the time of rear collision acts on the side frame 50 (see FIG. 6 (b) and FIG. 6 (c)), right and left bending is less likely to occur at the base portion 50a, but is likely to occur at the eccentric portion 50c. Accordingly, the eccentric portion 50c of the side frame 50 more easily becomes deformed inward in the right-left direction.

Also, in the state before deformation (see FIG. 6 (a)), the connecting portion 50b extends from the rear end of the base portion 50a to the rear side while being inclined inward in the right-left direction, and the eccentric portion 50c is connected to the base portion 50a via the connecting portion 50b, so that the base portion 50a and the eccentric portion 50c are disposed at positions where the base portion 50a and the eccentric portion 50c do not overlap in the front-rear direction. Therefore, when the load at the time of rear collision acts on the side frame 50 (see FIG. 6 (b) and FIG. 6 (c)), stress is concentrated on a connection portion P3 between the base portion 50a and the connecting portion 50b and a connection portion P4 between the connecting portion 50b and the eccentric portion 50c, and bending is likely to occur at the connection portions P3 and P4.

Moreover, since the rigidity of the connecting portion 50b and the eccentric portion 50c against right and left bending is lower than that of the base portion 50a, bending is more likely to occur at the connection portion P3 between the base portion 50a and the connecting portion 50b and the connection portion P4 between the connecting portion 50b and the eccentric portion 50c.

By making bending to be likely to occur at the connection portion P3 between the base portion 50a and the connecting portion 50b and the connection portion P4 between the connecting portion 50b and the eccentric portion 50c while suppressing deformation of bending in the right-left direction of the base portion 50a as described above, the side frame 50 can be reliably deformed inward in the right-left direction. Furthermore, by deforming the side frame 50 inward in the right-left direction, the side frame 50 can be inhibited from becoming deformed so as to reach the right and left side surfaces of the storage portion 102 (vehicle body side).

As described above, in the back frame 5, since the eccentric portion 50c of the side frame 50 is eccentric inward in the right-left direction with respect to the base portion 50a, the side frame 50 easily becomes deformed inward in the right-left direction at the time of rear collision. On the other hand, as described above, in the cushion frame 3, since the eccentric portion 32c of the side frame 32 (see FIGS. 4 (a) to 4 (c)) is eccentric outward in the right-left direction with respect to the base portion 32a, the side frame 32 easily becomes deformed outward in the right-left direction at the time of rear collision.

That is, by setting the eccentric directions of the eccentric portions 32c and 50c in the respective side frames 32 and 50 so as to be opposite to each other in the right-left direction, the side frame 32 of the cushion frame 3 and the side frame 50 of the back frame 5 can be deformed in directions opposite to each other in the right-left direction. Accordingly, deformations of the respective side frames 32 and 50 can be inhibited from interfering with each other, so that the energy at the time of rear collision can be efficiently absorbed. Therefore, damage to the on-board object 103 can be suppressed.

Also, the plate-shaped panel 33 is provided inward in the right-left direction of the side frame 32 in the cushion frame 3 (see FIGS. 4 (a) to 4 (c)), and the wire 53 is provided inward in the right-left direction of the side frame 50 in the back frame 5 (see FIGS. 6 (a) to 6 (c)). Since the wire 53 is formed in a linear shape having a smaller dimension in the right-left direction than the plate-shaped panel 33, it is relatively easy to ensure the opposing interval in the right-left direction between the wire 53 and the side frame 50, and it is relatively difficult to ensure the opposing interval between the panel 33 and the side frame 32.

In other words, the opposing interval in the right-left direction between the side frame 50 and the wire 53 in the back frame 5 is narrower than the opposing interval in the right-left direction between the side frame 32 and the panel 33 in the cushion frame 3. In this case, in the cushion frame 3, since the eccentric portion 32c of the side frame 32 is eccentric outward in the right-left direction with respect to the base portion 32a (the side frame 32 is deformed outward), even when the panel 33 is composed of a plate-shaped one, the panel 33 can be inhibited from interfering with the deformation of the side frame 32.

On the other hand, in the back frame 5, since the eccentric portion 50c of the side frame 50 is eccentric inward in the right-left direction with respect to the base portion 50a (the side frame 50 is deformed inward), the side frame 50 can be deformed, without the wire 53 interfering with this deformation, using the relatively wide space between the side frame 50 and the wire 53.

Accordingly, while the deformation of the side frame 32 of the cushion frame 3 and the deformation of the side frame 50 of the back frame 5 are inhibited from interfering with each other, the deformations of the side frames 32 and 50 thereof can be inhibited from interfering with the panel 33 and the wire 53, so that the energy at the time of rear collision can be efficiently absorbed.

As described above, in order to efficiently absorb the energy at the time of rear collision, the side frame 32 of the cushion frame 3 and the side frame 50 of the back frame 5 are preferably easily deformed, but it is necessary to ensure the strength against the load of a seated person in the used state.

On the other hand, in the present embodiment, the side frames 32 and 50 of the cushion frame 3 and the back frame 5 are each composed of a plate-shaped body having a smaller dimension in the right-left direction than the dimension in the up-down direction and the dimension in the front-rear direction. That is, the side frames 32 and 50, which are each composed of a plate-shaped body, are provided to the cushion frame 3 and the back frame 5 in a posture in which the plate thickness direction thereof is directed in the right-left direction. Thus, in the used state of being placed at the used position (see FIG. 1), the rigidity of the side frames 32 and 50 against bending in the up-down direction or the front-rear direction due to the load of a seated person can be ensured (section modulus can be increased).

On the other hand, in the storage state (see FIGS. 3 (a) and 3 (b)), the rigidity of the side frames 32 and 50 against bending in the right-left direction due to the load at the time of rear collision can be decreased (section modulus can be decreased). Accordingly, while the strength of the side frames 32 and 50 in the used state is ensured, the side frames 32 and 50 can be easily deformed in the right-left direction when a rear collision occurs in the storage state.

On the other hand, the back frame 5 becomes deformed so as to be compressed in the front-rear direction due to the deformation of the side frames 50 of the back frame 5 in the right-left direction. Thus, with this deformation, each headrest frame 6, which is pivotally supported (fixed) to the upper frame 51, is displaced toward the front side (see FIG. 6 (b) and FIG. 6 (c)). Since each headrest frame 6 in the storage state (state before deformation) is folded to the back frame 5 in a posture in which a distal end portion thereof is directed toward the front side, the distal end portion of the headrest frame 6 may collide against the front-side wall surface 102a of the storage portion 102 (on-board object 103) due to the deformation of the back frame 5.

On the other hand, in the present embodiment, the rigidity of the wire portion 61, which forms the portion on the distal end side of each headrest frame 6, is set so as to be lower than the main body portion 60, which forms the portion on the proximal end side thereof, and the rigidity of the main body portion 60 is also set so as to be lower at the portion on the distal end side, which is the wire portion 61 side, than at the portion on the proximal end side thereof. That is, the rigidity of the headrest frame 6 is set so as to gradually decrease from the proximal end to the distal end thereof.

Accordingly, even if the wire portion 61 of the headrest frame 6 collides against the front-side wall surface 102a of the storage portion 102 (on-board object 103), the wire portion 61 of the headrest frame 6 can be plastically deformed to absorb the energy due to this collision. Furthermore, after the deformation of the wire portion 61, the energy due to the collision can be more effectively absorbed by deforming the portion on the distal end side of the main body portion 60. Therefore, damage to the on-board object 103 can be suppressed.

As shown in FIG. 7 (a), each wire 53 of the back frame 5 includes an inclined portion 53a which is inclined downward from the upper surface of the lower frame 52 toward the rear side (arrow B side) in the storage state (state before deformation), and a connecting portion 53b which connects a lower end portion of the inclined portion 53a to the front surface of the upper frame 51. In the state before deformation, a connection portion P5 between the inclined portion 53a and the connecting portion 53b is located below the centers of gravity of the upper frame 51 and the lower frame 52, and the wire 53 is bent so as to be recessed downward.

That is, in the state before deformation, the wire 53 extends between the upper frame 51 and the lower frame 52 at a position eccentric downward with respect to the upper frame 51 and the lower frame 52. Thus, when the load at the time of rear collision acts on the wire 53 (see FIG. 7 (b) and FIG. 7 (c)), the wire 53 can be deformed in a state where the wire 53 is located below the upper frame 51 and the lower frame 52. Accordingly, the wire 53 can be easily deformed downward.

By the deformation of the wire 53, the energy at the time of rear collision can be absorbed. Furthermore, since the deformation direction of the wire 53 is the downward direction, the wire 53 can be inhibited from becoming deformed so as to reach the front-side wall surface 102a side of the storage portion 102 (on-board object 103 side). Accordingly, the load at the time of rear collision can be inhibited from acting on the on-board object 103, so that damage to the on-board object 103 can be suppressed.

In addition, stress is likely to occur at the connection portion P5 (bent portion) between the inclined portion 53a and the connecting portion 53b of the wire 53 due to the load at the time of rear collision. Thus, the wire 53 can be more reliably deformed downward starting from the connection portion P5.

Also, as described above, whereas the side frame 32 of the cushion frame 3 and the side frame 50 of the back frame 5 become deformed outward and inward in the right-left direction (see FIGS. 4 (a) to 4 (c) and FIGS. 6 (a) to 6 (c)), the wire 53 becomes deformed downward. Thus, the deformation directions of the side frames 32 and 50 and the deformation direction of the wire 53 are likely to be different from each other. Accordingly, the deformations of the side frames 32 and 50 and the deformation of the wire 53 can be inhibited from interfering with each other.

Furthermore, by deforming the panel 33 of the cushion frame 3 upward (see FIGS. 5 (a) to 5 (c)) and deforming the wire 53 of the back frame 5 downward as described above, the deformations of the panel 33 of the cushion frame 3 and the wire 53 of the back frame 5 can be inhibited from interfering with each other.

By deforming the wire 53 downward as described above, another member located above the wire 53 (for example, the cushion frame 3 (see FIG. 3 (b)) or the headrest frame 6) can be inhibited from interfering with the deformation of the wire 53 (stop of the deformation of the back frame 5 can be inhibited). Therefore, the energy at the time of rear collision can be efficiently absorbed, so that the load due to the rear collision can be inhibited from acting on the on-board object 103 side via the back frame 5.

Next, modifications of the side frame 32 of the cushion frame 3 will be described with reference to FIGS. 8 (a) and 8 (b). FIG. 8 (a) is a top view of a side frame 232 showing a first modification, and FIG. 8 (b) is a top view of a side frame 332 showing a second modification.

As shown in FIG. 8 (a), the side frame 232 of the first modification includes a pair of base portions 232a formed on both end sides thereof in the front-rear direction (up-down direction in FIG. 8 (a)), and an eccentric portion 232c connecting the pair of base portions 232a in the front-rear direction, and is formed by attaching together plate-shaped bodies having a U-shaped (C-shaped) cross-section. The pair of base portions 232a and the eccentric portion 232c are each formed in a straight shape extending in the front-rear direction, and are disposed at positions where the pair of base portions 232a and the eccentric portion 232c overlap in the front-rear direction.

The dimension in the right-left direction of the eccentric portion 232c is set so as to be smaller than the dimension in the right-left direction of each base portion 232a, whereby the rigidity of the eccentric portion 232c against right and left bending is set so as to be lower than that of each base portion 232a. In addition, the center of gravity of the eccentric portion 232c is located on one side (right side in FIG. 8 (a)) in the right-left direction with respect to the center of gravity of the base portion 232a. Accordingly, when a compressive load in the front-rear direction acts on the side frame 232, bending is likely to occur at a connection portion between each base portion 232a and the eccentric portion 232c.

Therefore, the side frame 232 easily becomes deformed toward the side where the eccentric portion 232c is eccentric with respect to each base portion 232a (right side in FIG. 8 (a)). Even when the base portions 232a and the eccentric portion 232c are disposed at positions where the base portions 232a and the eccentric portion 232c overlap in the front-rear direction as described above, the deformation direction of the side frame 232 can be controlled by causing at least the eccentric portion 232c, which has lower rigidity than each base portion 232a, to be eccentric to either the right or the left with respect to the base portion 232a.

As shown in FIG. 8 (b), the side frame 332 of the second modification is a side frame in which connecting portions 332b are added to the side frame 232 of the first modification. The side frame 332 includes a pair of base portions 332a formed on both end sides thereof in the front-rear direction (up-down direction in FIG. 8 (b)), a pair of connecting portions 332b extending from the pair of base portions 332a to the center side in the front-rear direction of the side frame 332 while being inclined to one side in the right-left direction (right side in FIG. 8 (b)), and an eccentric portion 332c connecting the pair of connecting portions 332b to each other in the front-rear direction, and is formed by attaching together plate-shaped bodies having a U-shaped (C-shaped) cross-section.

The pair of base portions 332a are each formed in a straight shape extending in the front-rear direction, and the pair of base portions 332a and the eccentric portion 332c are disposed at positions where the pair of base portions 332a and the eccentric portion 332c do not overlap in the front-rear direction.

The dimension in the right-left direction of each of the connecting portions 332b and the eccentric portion 332c is set so as to be smaller than the dimension in the right-left direction of each base portion 332a, whereby the rigidity of each of the connecting portions 332b and the eccentric portion 332c against right and left bending is set so as to lower than that of each base portion 332a. In addition, the center of gravity of the eccentric portion 332c is located on one side in the right-left direction (right side in FIG. 8 (b)) with respect to the center of gravity of the base portion 332a. Accordingly, when a compressive load in the front-rear direction acts on the side frame 332, bending is likely to occur at a connection portion between each base portion 332a and each connecting portion 332b and a connection portion between each connecting portion 332b and the eccentric portion 332c.

Moreover, since the pair of base portions 332a and the eccentric portion 332c are disposed at positions where the pair of base portions 332a and the eccentric portion 332c do not overlap in the front-rear direction, bending is more likely to occur at the connection portions between the respective portions, that is, between the base portions 332a, the connecting portions 332b, and the eccentric portion 332c. Therefore, the side frame 332 easily becomes deformed toward the side where the eccentric portion 332c is eccentric with respect to each base portion 332a (right side in FIG. 8(b)).

While the present invention has been described above based on the above embodiment, the present invention is not limited to the above embodiment at all. It can be easily understood that various modifications can be made without departing from the spirit of the present invention. For example, it is possible to apply the configuration of the side frame 32, 232, or 332 of the cushion frame 3 in the above embodiment to each side frame of the back frame 5, or apply the configuration of the side frame 50 of the back frame 5 to each side frame of the cushion frame 3.

In the above embodiment, a secondary battery or a fuel cell has been described as an example of the on-board object 103 mounted on the vehicle 100, but the on-board object 103 is not necessarily limited thereto. The on-board object 103 mounted on the vehicle 100 may be one other than a secondary battery or a fuel cell. If the vehicle 100 is intended to suppress damage to the on-board object 103, the vehicle seat 1 of the above embodiment is suitable for use in the vehicle 100.

In the above embodiment, the specific description of the method for connecting the respective members of the vehicle seat 1 to each other and the method for connecting the plate-shaped bodies, which form the side frame 32, 232, or 332, to each other has been omitted, but appropriate means such as welding or bolting may be used for the connection therebetween.

In the above embodiment, the case has been described where the base portion and the eccentric portion are formed in each of the side frames 32, 232, and 332, the panels 33 (support members) of the cushion frame 3, and the side frames 50 of the back frame 5. However, the present invention is not necessarily limited thereto. When a base portion and an eccentric portion are provided to each support member or side frame of at least either the cushion frame 3 or the back frame 5, the energy at the time of rear collision can be absorbed.

In the above embodiment, the case has been described where a difference in rigidity against bending in the right-left direction or the up-down direction is provided for each of the side frames 32 of the cushion frame 3, the panels 33 (support members), and the side frames 50 of the back frame 5. However, the present invention is not necessarily limited thereto. In each side frame or support member, the difference in rigidity against bending in the right-left direction or the up-down direction may be constant. If each side frame or support member has at least the configuration of the base portion and the eccentric portion described in the above embodiment, each side frame or support member can be easily deformed in the right-left direction or the up-down direction.

In the above embodiment, the case has been described where, for example, the side frames 32, 232, and 332 are each formed by attaching together plate-shaped bodies (so as to form a region where the plate-shaped bodies are not attached together in part), the projection portions 33d and the recess portions 33e are formed in each plate-shaped panel 33, and the dimension in the front-rear direction of each side frame 50 is changed, whereby a difference in rigidity against bending is provided for each member. However, the present invention is not necessarily limited thereto.

The means for changing the rigidity (section modulus) against bending in the right-left direction or the up-down direction is not limited, and examples of other such means are providing ribs to each member or forming through holes (dents) in each member. In addition, a difference in rigidity may be provided by forming a partial region of each member from a material different from that of the other region.

In the above embodiment, the case has been described where the eccentric portion 32c of each side frame 32 of the cushion frame 3 is eccentric outward in the right-left direction with respect to the base portion 32a, and the eccentric portion 50c of each side frame 50 of the back frame 5 is eccentric inward in the right-left direction with respect to the base portion 50a. That is, the case has been described where the eccentric directions of the eccentric portions 32c and 50c with respect to the base portions 32a and 50a in each side frame 32 of the cushion frame 3 and each side frame 50 of the back frame 5 are different from each other. However, the present invention is not necessarily limited thereto.

For example, the eccentric portion 32c of each side frame 32 of the cushion frame 3 may be eccentric inward in the right-left direction with respect to the base portion 32a, and the eccentric portion 50c of each side frame 50 of the back frame 5 may be eccentric outward in the right-left direction with respect to the base portion 50a.

Moreover, the eccentric directions of the eccentric portions 32c and 50c with respect to the base portions 32a and 50a in each side frame 32 of the cushion frame 3 and each side frame 50 of the back frame 5 may be the same.

In this case, when each of the eccentric directions of the eccentric portions 32c and 50c with respect to the base portions 32a and 50a in each side frame 32 of the cushion frame 3 and each side frame 50 of the back frame 5 is set to be outward in the right-left direction, the deformation of the side frames 32 and 50 can be inhibited from interfering with the panel 33 and the wire 53 (support member).

On the other hand, when each of the eccentric directions of the eccentric portions 32c and 50c with respect to the base portions 32a and 50a is set to be inward in the right-left direction, the side frames 32 and 50 can be inhibited from becoming deformed so as to reach the right and left sides of the storage portion 102 (vehicle body side).

In the above embodiment, the case has been described where the rigidity (section modulus) of each side frame 32 of the cushion frame 3 and each side frame 50 of the back frame 5 against bending in the up-down direction (front-rear direction) is set so as to be higher than that against bending in the right-left direction. However, the present invention is not necessarily limited thereto. For example, the rigidity of the side frames 32 and 50 against bending in the right-left direction and the rigidity (section modulus) of the side frames 32 and 50 against bending in the up-down direction may be the same. In this case as well, when an eccentric portion eccentric inward or outward in the right-left direction is formed in each of at least partial regions of the side frames 32 and 50, the side frames 32 and 50 can be easily deformed inward or outward in the right-left direction.

In the above embodiment, the panels 33 have been described as an example of the support member provided to the cushion frame 3, and the wires 53 have been described as an example of the support member provided to the back frame 5. However, the present invention is not necessarily limited thereto. It is possible to use the wires 53 for the cushion frame 3 and use the panels 33 for the back frame 5, and instead of the panels 33 or the wires 53, a meandering spring or the like may be used.

When the panels 33 are used for the back frame 5, the eccentric portion 33c is preferably made eccentric upward with respect to the first base portion 33a and the second base portion 33b in the storage state. Accordingly, each panel 33 can be deformed upward by the load at the time of rear collision, so that the bottom surface of the storage portion 102 can be inhibited from interfering with the deformation of the panel 33.

In the above embodiment, the case has been described where the eccentric portion 33c of each panel 33 is eccentric upward with respect to the first base portion 33a and the second base portion 33b. However, the present invention is not necessarily limited thereto. For example, the eccentric portion 33c of each panel 33 may be eccentric downward with respect to the first base portion 33a and the second base portion 33b.

In the above embodiment, the case has been described where the rigidity of the eccentric portion 33c against bending in the up-down direction is made higher than that of the first base portion 33a and the second base portion 33b by forming the projection portions 33d and the recess portions 33e in the eccentric portion 33c of each panel 33. However, the present invention is not necessarily limited thereto. For example, the projection portions 33d and the recess portions 33e of each panel 33 may be omitted, and the rigidity against bending in the up-down direction may be set so as to be the same for each of the first base portion 33a, the second base portion 33b, and the eccentric portion 33c.

In the above embodiment, the case has been described where the wires 53 are eccentric downward with respect to the upper frame 51 and the lower frame 52 in the storage state. However, the present invention is not necessarily limited thereto. For example, the wires 53 may be eccentric upward with respect to the upper frame 51 and the lower frame 52.

In the above embodiment, the case has been described where the rigidity of the distal end side of each headrest frame 6 is made lower by forming the wire portion 61 on the distal end side of the main body portion 60 of the headrest frame 6. However, the present invention is not necessarily limited thereto. For example, the configuration corresponding to the wire portion 61 of the headrest frame 6 (the portion where the rigidity is relatively low) may be omitted, and the rigidity of the headrest frame 6 may be constant from the proximal end side to the distal end side.

DESCRIPTION OF REFERENCE NUMERALS

1: vehicle seat
20: rotation shaft
3: cushion frame
30: rear frame (first frame)
31: front frame (second frame)
32, 232, 332: side frame
32a, 232a, 332a: base portion of the side frame
32b, 332b: connecting portion
32c, 232c, 332c: eccentric portion of the side frame
32c1: low-rigidity portion
33: panel (support member)
33a: first base portion (base portion of the support member)
33b: second base portion (base portion of the support member)
5: back frame
50: side frame
50a: base portion of the side frame
50b: connecting portion
50c: eccentric portion of the side frame
51: upper frame (first frame)
52: lower frame (second frame)
53: wire (support member)
6: headrest frame
60: main body portion (first portion)
61: wire portion (second portion)
100: vehicle
103: on-board object

The invention claimed is:

1. A vehicle seat comprising a cushion frame, a back frame, and a rotation shaft pivotally supporting the cushion frame and the back frame such that the cushion frame and the back frame are rotatable around an axis thereof along a right-left direction, wherein
the vehicle seat is configured to be rotatable around the rotation shaft between a used position on a front side with respect to the rotation shaft and a storage position on a rear side with respect to the rotation shaft in a state where the back frame is folded to the cushion frame side,
the cushion frame and the back frame each include a pair of side frames forming portions on both end sides thereof in the right-left direction and extending in a front-rear direction in the storage state,
the side frames each include a base portion forming a portion on one end side in the front-rear direction in the storage state, and an eccentric portion which is eccentric inward or outward in the right-left direction with respect to the base portion in the storage state and for which rigidity against bending in the right-left direction is set so as to be lower than that of the base portion,
the vehicle seat is used for a vehicle having an on-board object on the front side of the cushion frame and the back frame in a storage state where the cushion frame and the back frame are stored at the storage position,
in each side frame of the back frame, the eccentric portion is eccentric inward in the right-left direction with respect to the base portion, and in each side frame of the cushion frame, the eccentric portion is eccentric outward in the right-left direction with respect to the base portion,
each side frame includes a connecting portion connecting the base portion and the eccentric portion, and
rigidity of each connecting portion against bending in the right-left direction is set so as to be lower than that of each base portion of the side frame.

2. A vehicle seat comprising a cushion frame, a back frame, and a rotation shaft pivotally supporting the cushion frame and the back frame such that the cushion frame and the back frame are rotatable around an axis thereof along a right-left direction, wherein
the vehicle seat is configured to be rotatable around the rotation shaft between a used position on a front side with respect to the rotation shaft and a storage position on a rear side with respect to the rotation shaft in a state where the back frame is folded to the cushion frame side,
the cushion frame and the back frame each include a pair of side frames forming portions on both end sides thereof in the right-left direction and extending in a front-rear direction in the storage state,
the side frames each include a base portion forming a portion on one end side in the front-rear direction in the storage state, and an eccentric portion which is eccentric inward or outward in the right-left direction with respect to the base portion in the storage state and for which rigidity against bending in the right-left direction is set so as to be lower than that of the base portion, the vehicle seat is used for a vehicle having an on-board object on the front side of the cushion frame and the back frame in a storage state where the cushion frame and the back frame are stored at the storage position, the cushion frame and the back frame each include a first frame and a second frame provided at a predetermined interval in the front-rear direction so as to extend in the right-left direction in the storage state, and a support member extending between the first frame and the second frame and supporting a cushion member between the pair of side frames, the support member extends between the first frame and the second frame at a position eccentric upward or downward with respect to the first frame and the second frame in the storage state, each side frame includes a connecting portion connecting the base portion and the eccentric portion, and rigidity of each connecting portion against bending in the right-left direction is set so as to be lower than that of each base portion of the side frame.

3. The vehicle seat according to claim 1, wherein the base portion and the eccentric portion of each side frame are disposed at positions where the base portion and the eccentric portion do not overlap in the front-rear direction in the storage state.

4. The vehicle seat according to claim 1, wherein the eccentric portion of each side frame includes a low-rigidity portion located on a center side from both ends thereof in the front-rear direction in the storage state, and rigidity of the eccentric portion of each side frame against bending in the right-left direction is set so as to be lower at the low-rigidity portion than in a region where the low-rigidity portion is not formed.

5. The vehicle seat according to claim 4, wherein the low-rigidity portion is formed at a position eccentric in the right-left direction with respect to a center of gravity of the eccentric portion of the side frame, and an eccentric direction of the eccentric portion with respect to the base portion and an eccentric direction of the low-rigidity portion with respect to the eccentric portion in the side frame are set so as to be the same.

6. The vehicle seat according to claim 1, wherein a dimension in the right-left direction of each of the side frames of the cushion frame and the back frame is set so as to be smaller than a dimension in an up-down direction and a dimension in the front-rear direction thereof.

7. The vehicle seat according to claim 1, further comprising a headrest frame pivotally supported by the back frame and configured to be foldable to the back frame in a posture in which a distal end thereof is directed to the front side in the storage state, wherein the headrest frame includes a first portion and a second portion for which rigidity is set so as to be lower than that of the first portion and which forms a distal end portion of the headrest frame.

8. The vehicle seat according to claim 1, wherein the cushion frame and the back frame each include a support member supporting a cushion member in an opposing interval between the side frames, and an opposing interval in the right-left direction between each side frame of the cushion frame and the support member is set so as to be smaller than an opposing interval in the right-left direction between each side frame of the back frame and the support member.

9. The vehicle seat according to claim 2, wherein the support member of the cushion frame is eccentric upward with respect to the first frame and the second frame of the cushion frame in the storage state, and the support member of the back frame is eccentric downward with respect to the first frame and the second frame of the back frame in the storage state.

10. The vehicle seat according to claim 2, wherein the support member includes a pair of base portions connected to the first frame and the second frame and forming portions on both end sides thereof in the front-rear direction in the storage state, and an eccentric portion eccentric in the up-down direction with respect to the pair of base portions in the storage state, and rigidity of each base portion of the support member against bending in the up-down direction is set so as to be lower than that of the eccentric portion of the support member.

11. The vehicle seat according to claim 2, wherein the base portion and the eccentric portion of each side frame are disposed at positions where the base portion and the eccentric portion do not overlap in the front-rear direction in the storage state.

12. The vehicle seat according to claim 2, wherein the eccentric portion of each side frame includes a low-rigidity portion located on a center side from both ends thereof in the front-rear direction in the storage state, and rigidity of the eccentric portion of each side frame against bending in the right-left direction is set so as to be lower at the low-rigidity portion than in a region where the low-rigidity portion is not formed.

13. The vehicle seat according to claim 12, wherein the low-rigidity portion is formed at a position eccentric in the right-left direction with respect to a center of gravity of the eccentric portion of the side frame, and an eccentric direction of the eccentric portion with respect to the base portion and an eccentric direction of the low-rigidity portion with respect to the eccentric portion in the side frame are set so as to be the same.

14. The vehicle seat according to claim 2, wherein a dimension in the right-left direction of each of the side frames of the cushion frame and the back frame is set so as to be smaller than a dimension in an up-down direction and a dimension in the front-rear direction thereof.

15. The vehicle seat according to claim 2, further comprising a headrest frame pivotally supported by the back frame and configured to be foldable to the back frame in a posture in which a distal end thereof is directed to the front side in the storage state, wherein the headrest frame includes a first portion and a second portion for which rigidity is set so as to be lower than that of the first portion and which forms a distal end portion of the headrest frame.

* * * * *